US011530096B2

(12) United States Patent
Layne et al.

(10) Patent No.: US 11,530,096 B2
(45) Date of Patent: Dec. 20, 2022

(54) ADJUSTABLE CONVEYOR BELT GUIDERAIL AND RELATED METHODS

(71) Applicant: SPAN TECH LLC, Glasgow, KY (US)

(72) Inventors: James L. Layne, Bowling Green, KY (US); Stephen C. Fye, Glasgow, KY (US); Scott Dayton Barbour, Glasgow, KY (US); Aaron Cotton, Glasgow, KY (US); Savannah Bell, Glasgow, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 17/392,587

(22) Filed: Aug. 3, 2021

(65) Prior Publication Data

US 2021/0362956 A1 Nov. 25, 2021

Related U.S. Application Data

(63) Continuation of application No. 16/303,694, filed as application No. PCT/US2018/033665 on May 21, 2018, now Pat. No. 11,097,901.

(60) Provisional application No. 62/550,023, filed on Aug. 25, 2017, provisional application No. 62/508,700, filed on May 19, 2017.

(51) Int. Cl.

| | |
|---|---|
| ***B65G 21/10*** | (2006.01) |
| ***B65G 21/22*** | (2006.01) |
| ***B65G 39/18*** | (2006.01) |
| ***B65G 47/28*** | (2006.01) |
| ***B65G 21/20*** | (2006.01) |

(52) U.S. Cl.

CPC ......... *B65G 21/10* (2013.01); *B65G 21/2072* (2013.01); *B65G 21/22* (2013.01); *B65G 39/18* (2013.01); *B65G 47/28* (2013.01); *B65G 2812/02069* (2013.01)

(58) Field of Classification Search

CPC ........ B65G 21/10; B65G 21/22; B65G 39/18; B65G 47/28

USPC .................................. 198/636, 836.1, 836.3

See application file for complete search history.

(56) References Cited

U.S. PATENT DOCUMENTS 2,156,020 A * 4/1939 Lathrop ............ B65G 21/2072 198/836.3
2,229,605 A * 1/1941 Snyder .............. B65G 21/2072 198/836.3

(Continued)

FOREIGN PATENT DOCUMENTS

| | | |
|---|---|---|
| EP | 1840051 A1 | 10/2007 |
| JP | S5922218 U | 7/1982 |
| JP | 20060282321 A | 10/2006 |

*Primary Examiner* — Douglas A Hess

(74) *Attorney, Agent, or Firm* — Dickinson Wright PLLC; Andrew D. Dorisio

(57) ABSTRACT

An apparatus for guiding products along a conveyor in a conveying direction. The apparatus includes a first guiderail for at least partially forming a conveying path for articles on the conveyor. A guiderail adjuster includes a flexible or collapsible support, which make take the form of a linkage, and which provides support for the first guiderail along the conveyor. The flexible or collapsible support is adapted for being extended and retracted along a support rail extending in the conveying direction to selectively position the first guiderail relative to the conveyor, and thereby alter (increase or decrease) the width of the conveying path. Related methods are also disclosed.

16 Claims, 26 Drawing Sheets

(56) References Cited

U.S. PATENT DOCUMENTS 3,776,350 A * 12/1973 Tice .................. B65G 21/2072 198/836.3
4,214,744 A * 7/1980 Evans ................ B65H 29/6618 198/836.2
5,099,979 A * 3/1992 Kehrel ..................... B26D 7/01 198/836.3
5,682,976 A * 11/1997 Jorgensen .......... B65G 21/2072 198/836.3
5,685,415 A * 11/1997 East ....................... B65G 15/60 198/812
5,782,339 A * 7/1998 Drewitz ............. B65G 21/2072 198/836.3
5,791,453 A * 8/1998 Schmits ............. H05K 13/0061 198/817
6,189,685 B1 * 2/2001 Ledingham ........ B65G 21/2072 198/836.3
6,378,695 B1 * 4/2002 Rinne ................ B65G 21/2072 198/836.3
6,460,689 B2 * 10/2002 Albrecht ................. B42C 19/08 198/836.3
7,207,428 B2 * 4/2007 Huttner .................. B65G 43/08 198/444
7,520,380 B2 * 4/2009 Ranger .............. B65G 21/2072 198/836.3
7,607,531 B2 * 10/2009 Bonhomme ....... B65G 21/2072 198/452
7,717,254 B2 * 5/2010 Brackley ................. C03B 35/14 198/836.3
8,490,776 B2 * 7/2013 Seger ................... B65G 47/766 198/444
8,931,631 B2 * 1/2015 Vasse ................... B65G 47/088 198/836.3
8,955,668 B2 * 2/2015 Cavallaro, III ......... C03B 35/14 198/836.3
9,004,821 B2 * 4/2015 Garner ............... B65G 21/2072 406/87
9,828,186 B2 * 11/2017 Weickert ............ B65G 21/2072
10,753,785 B2 * 8/2020 Merz ...................... B65G 47/28
2012/0222941 A1 9/2012 Liebhardt et al.
2017/0066596 A1 3/2017 Weickert et al.

* cited by examiner 28
20a
28
20b 20a
12
20b
20
24
28
26

28
26
22
20a
12
20b 26
22,24
78a
78
78b
44

ADJUSTABLE CONVEYOR BELT GUIDERAIL AND RELATED METHODS

This application is a continuation of U.S. patent application Ser. No. 16/303,694, which claims the benefit of U.S. Provisional Patent Application Ser. Nos. 62/508,700, filed May 19, 2017, 62/550,023, filed Aug. 25, 2017, and which is a National Stage of PCT/US2018/033665 filed on May 21, 2018, the disclosures of which are fully incorporated herein by reference.

TECHNICAL FIELD

This disclosure relates to the article conveying arts and, in particular, to an adjustable conveyor belt guiderail and related methods.

BACKGROUND

Conveyors typically have rails positioned along each side of the conveyor chain or belt to guide an article along a conveying path. Articles travel between the rails, which are positioned to ensure that the articles remain on the conveying path. When a larger or smaller article is conveyed, or the width of the conveying path otherwise needs to be adjusted to accommodate an increased or reduced article flow, the guiderails must be adjusted to fit the situation.

Conventional guiderail adjustment systems use extending guide rods, which support a bracket attached to the guiderail. When the guiderails need to be adjusted, the rods can be moved along the brackets, which is typically manually done. These guide rods also protrude outwardly away from the conveyor and into the surrounding area, thus increasing the overall width and footprint of the conveyor. The guiderails including rigid rods also create an unappealing look, since the extended portions of the rods project from the conveyor sides.

Accordingly, a need is identified for an adjustable guiderail that overcomes the foregoing limitations and possibly others that have yet to be realized.

SUMMARY

According to one aspect of the disclosure, an apparatus for supporting a guiderail for guiding one or more articles conveyed along a conveyor having a conveying path in a conveying direction. The apparatus comprises a support rail and at least one adjuster for adjusting a position of the guiderail relative to the conveyor in a direction transverse to the conveying direction. The at least one adjuster comprises a collapsible support for engaging the support rail and supporting the guiderail, the collapsible support adapted for being extended and retracted into the conveying path in a direction transverse to the conveying direction to selectively position the guiderail relative to the support rail, the adjuster including a retainer for fixing a location of the adjuster.

In one embodiment, the collapsible support comprises a pair of arms connected for relative pivoting movement at one end, and each connected to a shuttle for engaging the support rail at another end. Each of the pair of arms may be pivotably connected to a connector, the connector including a receiver adapted for receiving a portion of the guiderail. The connector may include an extension for engaging the support rail to prevent the pair of arms from reaching a locked position.

Each shuttle may comprise the retainer for engaging the support rail. At least one of the shuttles may include at least one roller for rotatably engaging the support rail.

The retainer may comprise an actuator for selectively adjusting the retainer for fixing or unfixing the location of the adjuster. The actuator may include a wedge. The actuator may further include a lever for moving the wedge into engagement with the support rail for fixing the location of the adjuster.

According to another aspect of the disclosure, an apparatus for supporting a guiderail for guiding one or more articles conveyed along a conveyor having a conveying path in a conveying direction in connection with a support rail is provided. The apparatus comprises at least one adjuster for adjusting a position of the guiderail relative to the conveyor in a direction transverse to the conveying direction. The at least one adjuster comprises a collapsible support for engaging the support rail and supporting the guiderail, the collapsible support adapted for being extended and retracted into the conveying path in a direction transverse to the conveying direction to selectively position the guiderail relative to the support rail, the at least one adjuster including a retainer for fixing a location of the adjuster.

The collapsible support may comprise a pair of arms connected for relative pivoting movement at one end, and each connected to a shuttle for engaging the support rail at another end. Each arm of the pair of arms is pivotably connected to a connector, the connector including a receiver adapted for receiving a portion of the guiderail. The connector may include an extension for engaging the support rail to prevent the pair of arms from reaching a locked position.

Each shuttle may comprise a retainer for engaging the support rail. At least one of the shuttles includes at least one roller for rotatably engaging the support rail. The clamp comprises an actuator for selectively activating or releasing the clamp.

Still a further aspect of the disclosure pertains to an apparatus for supporting a guiderail for guiding one or more articles conveyed along a conveyor having a conveying path in a conveying direction in connection with a support rail. The apparatus comprises a shuttle adapted for moving to and fro along the support rail, the shuttle including a lever for selectively urging a wedge to fix the location of the shuttle.

A collapsible support comprises a pair of arms connected for relative pivoting movement at one end. At least one of the arms is connected to the shuttle for engaging the support rail at another end.

In one embodiment, each arm of the pair of arms is pivotably connected to a connector, the connector including a receiver adapted for receiving a portion of the guiderail. The connector may include an extension for engaging the support rail to prevent the pair of arms from reaching a locked position.

BRIEF DESCRIPTION OF THE DRAWING FIGURES

The accompanying drawing figures incorporated herein and forming a part of the specification, illustrate several aspects of the disclosed inventions and, together with the textual description, serve to explain certain principles thereof. In the drawing figures.

Figure 1:
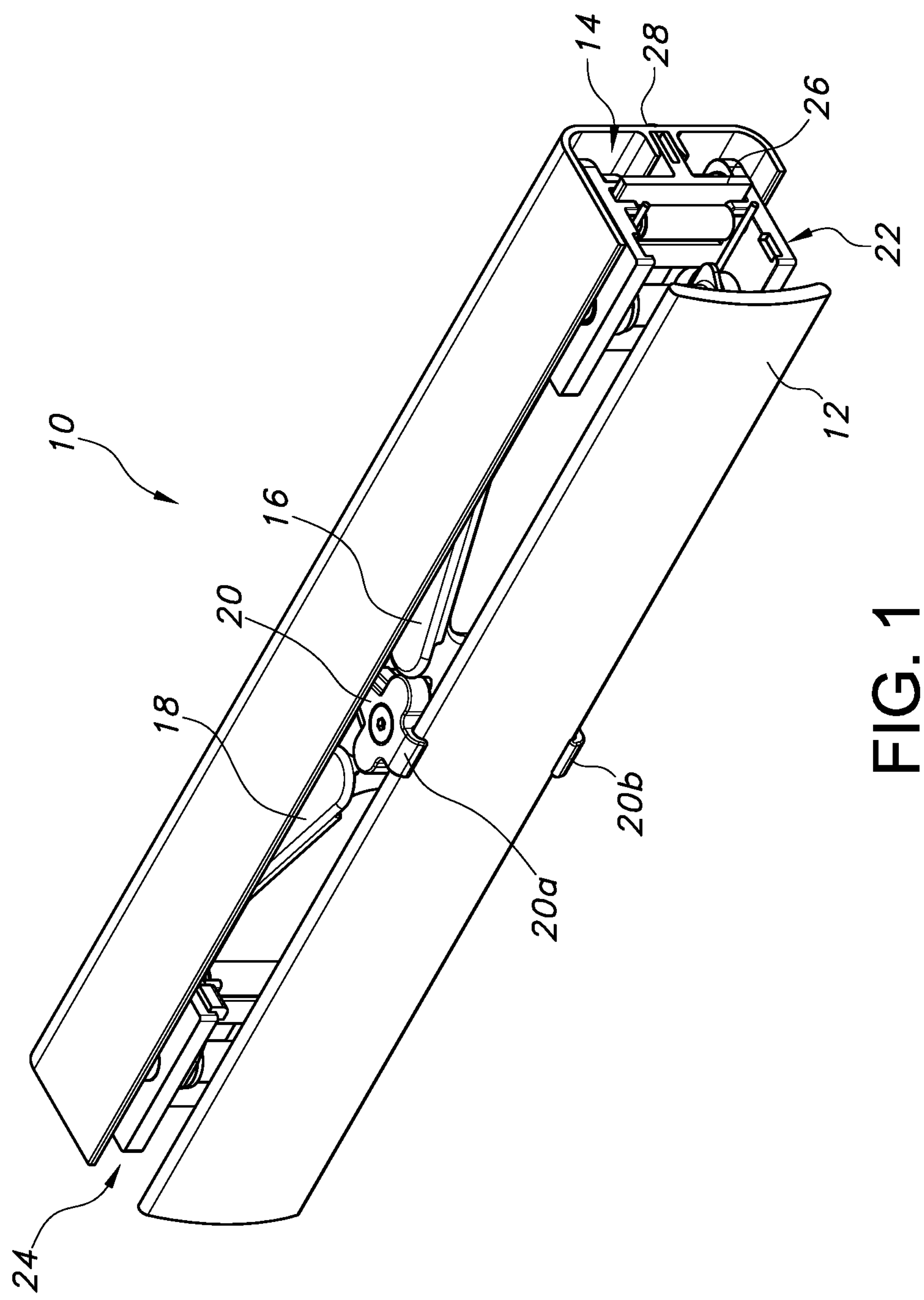
FIG. 1 is a top perspective view of one embodiment of a single conveyor guiderail adjuster according to one embodiment of the disclosure.
Figure 2:
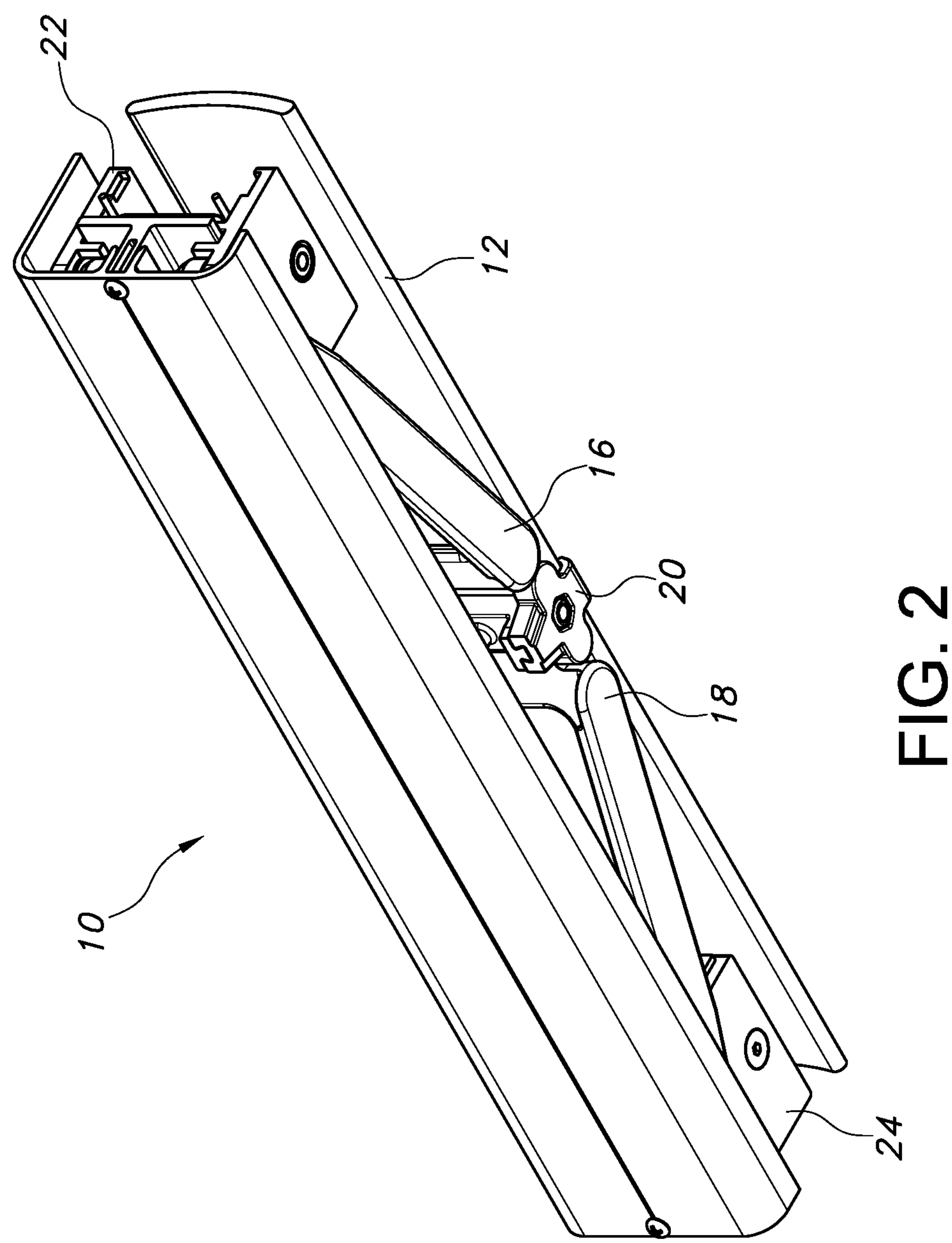
FIG. 2 is a bottom perspective view of the adjuster of FIG. 1.
Figure 3:
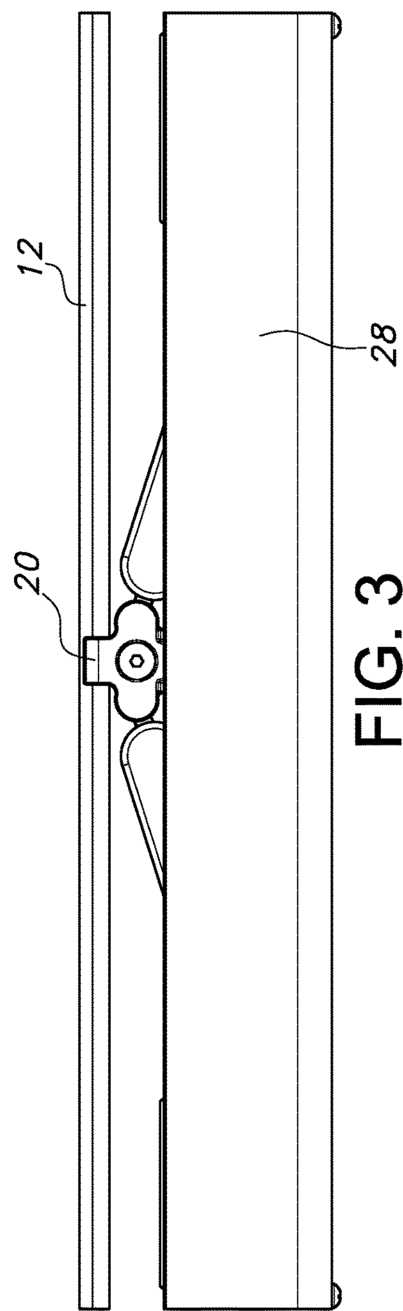
Figure 4:
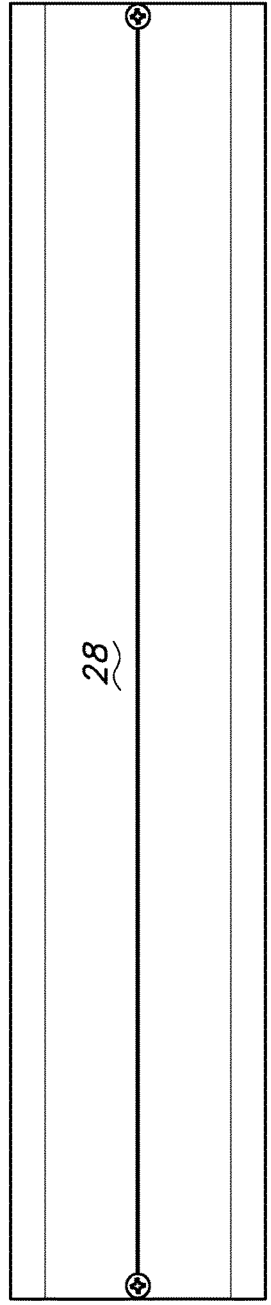
Figure 5:
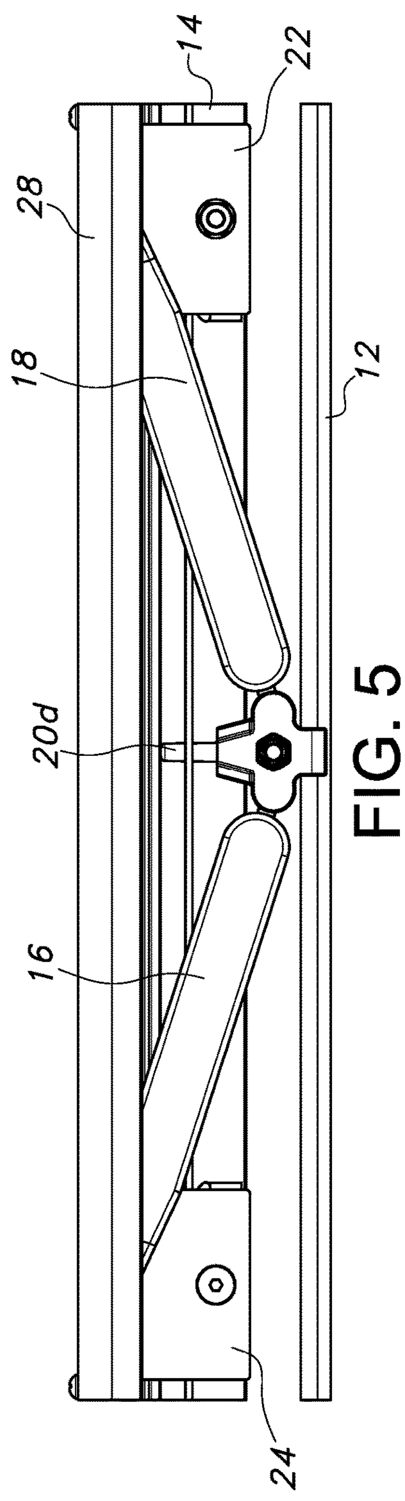
Figure 6:
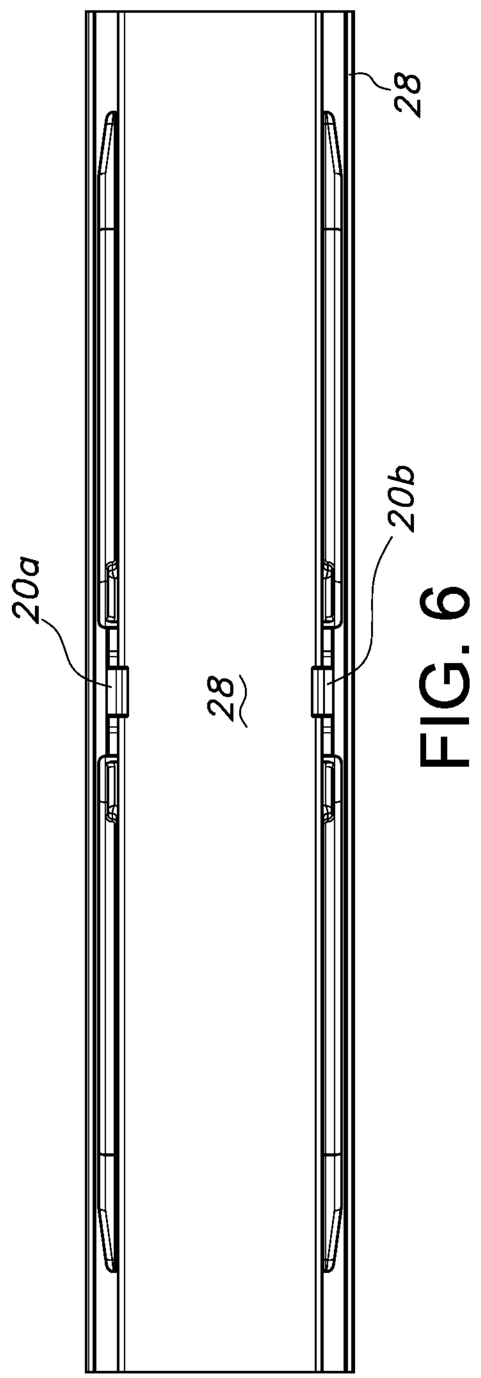
Figure 7:
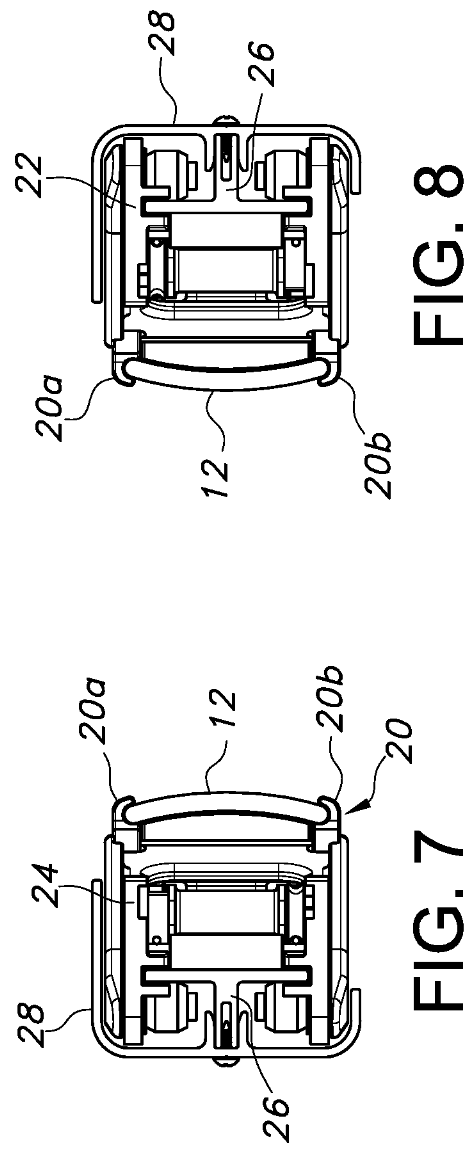
Figure 8:
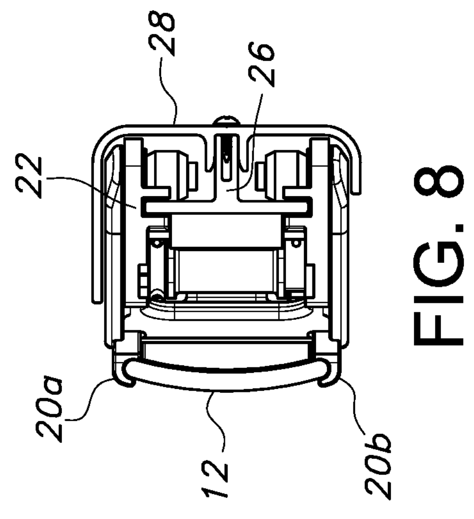
Figure 9:
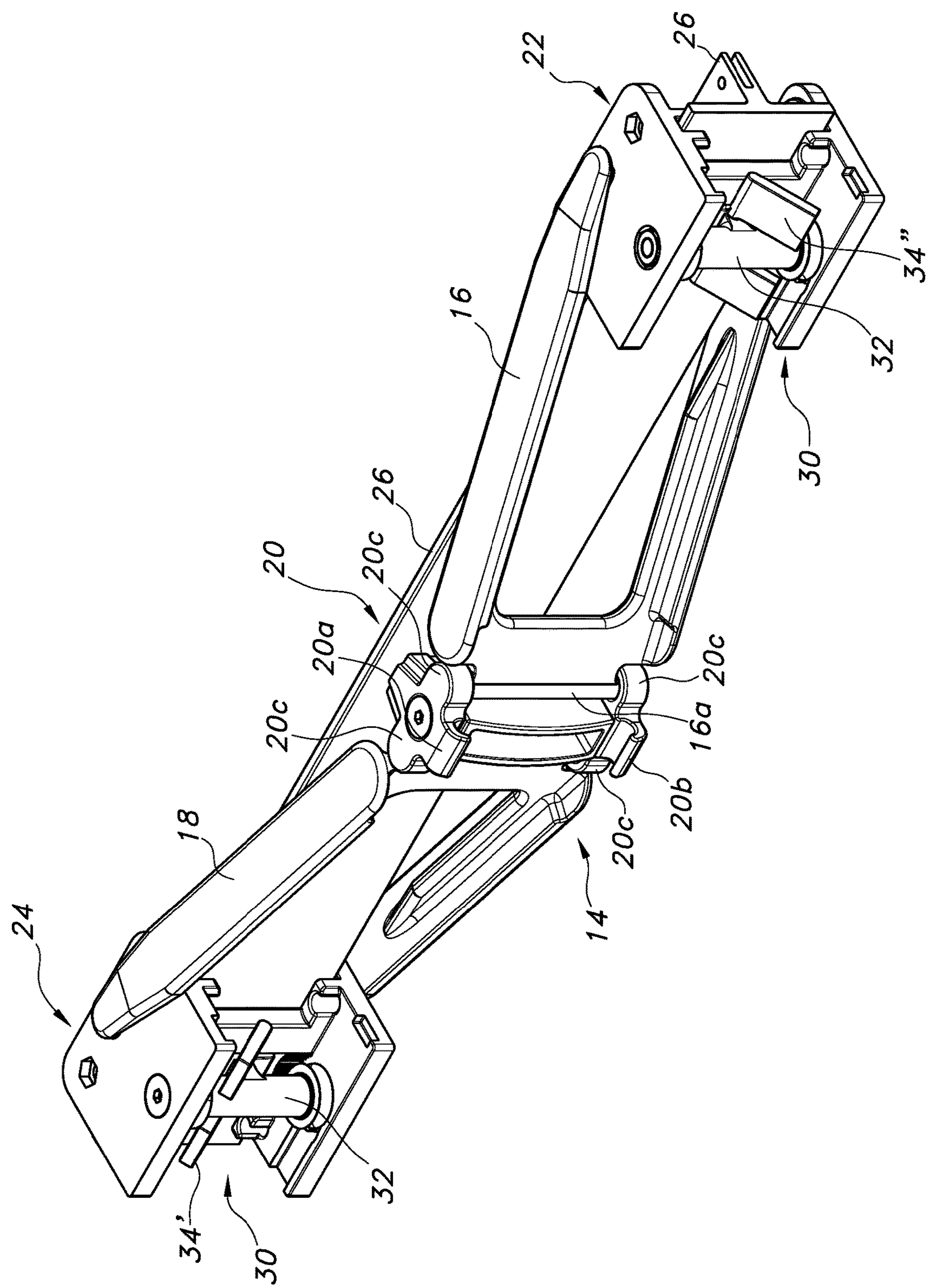
Figure 9A:
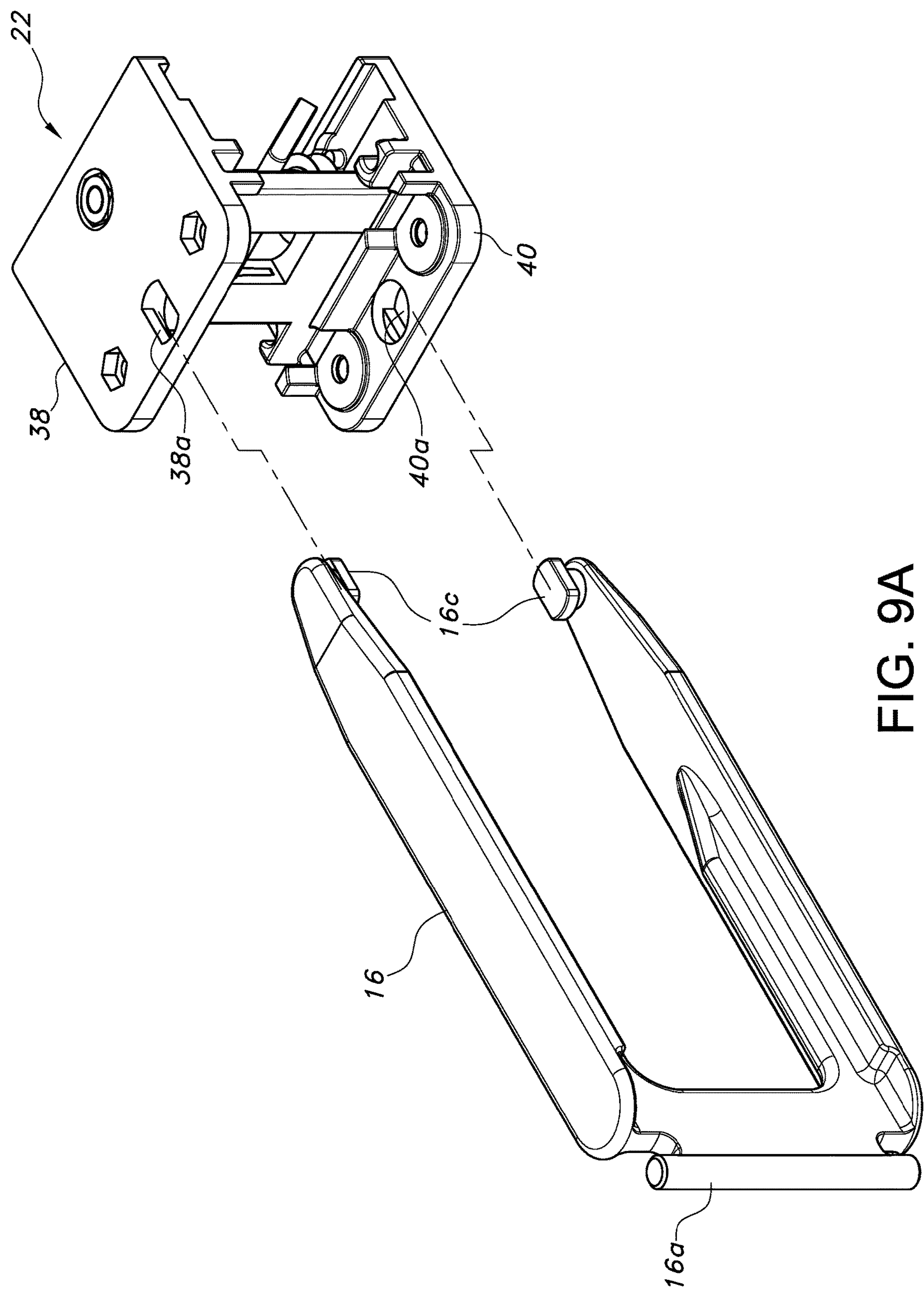
Figure 9C:
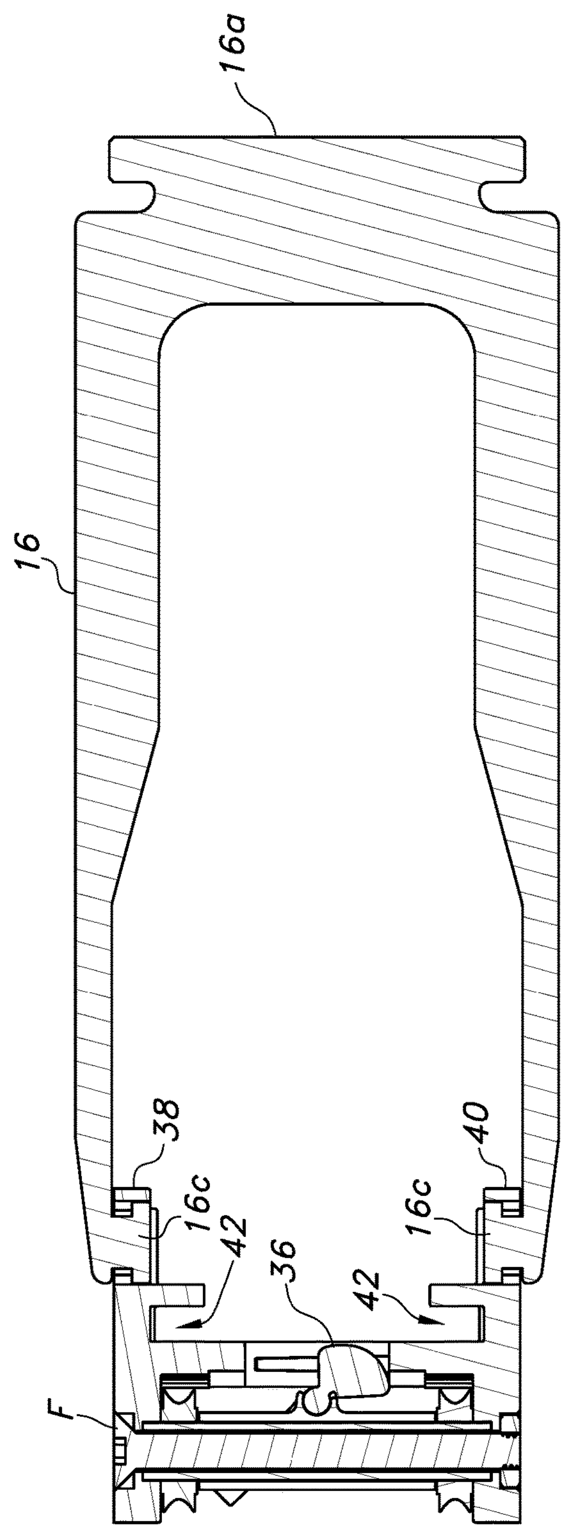
Figure 9B:
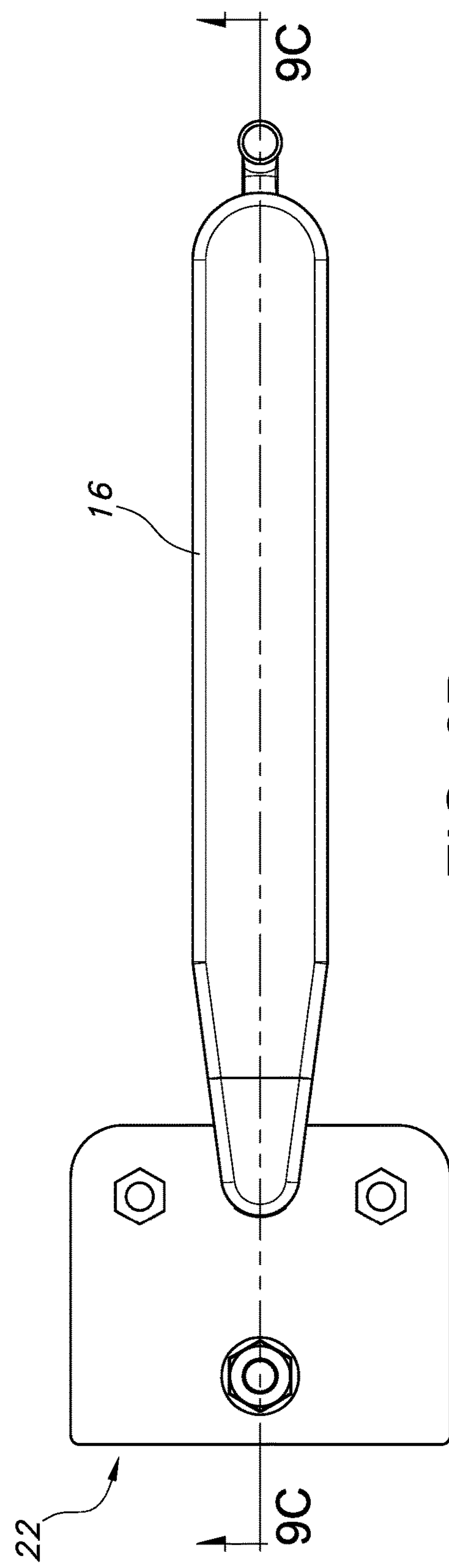
Figure 10:
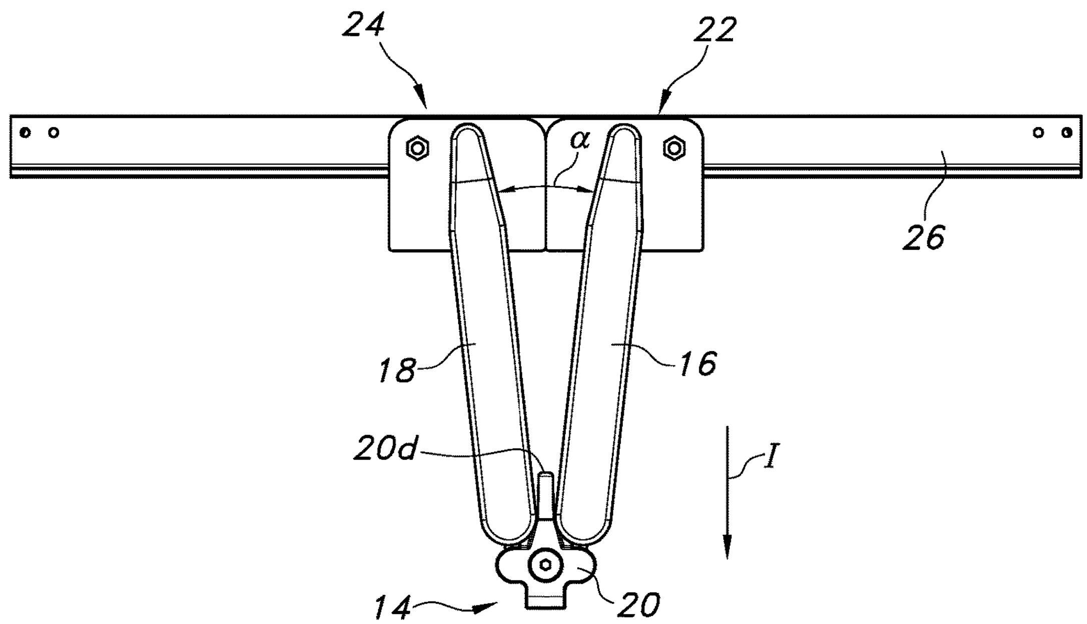
Figure 11:
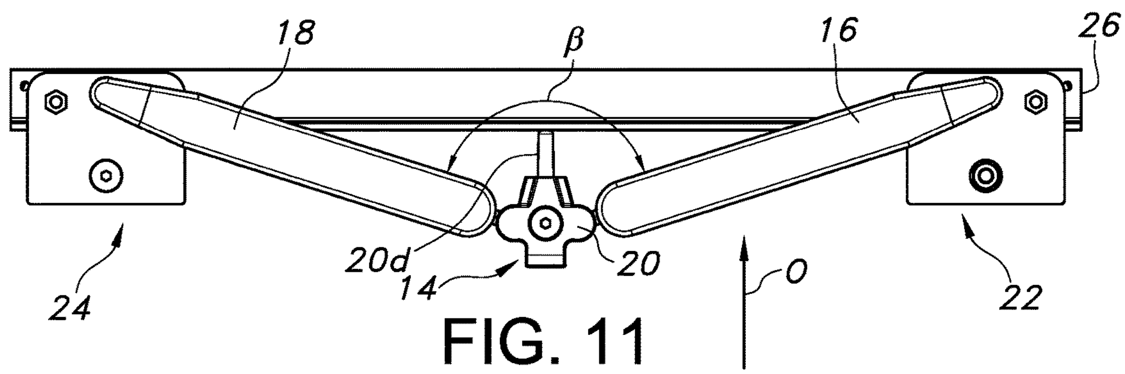
Figure 12:
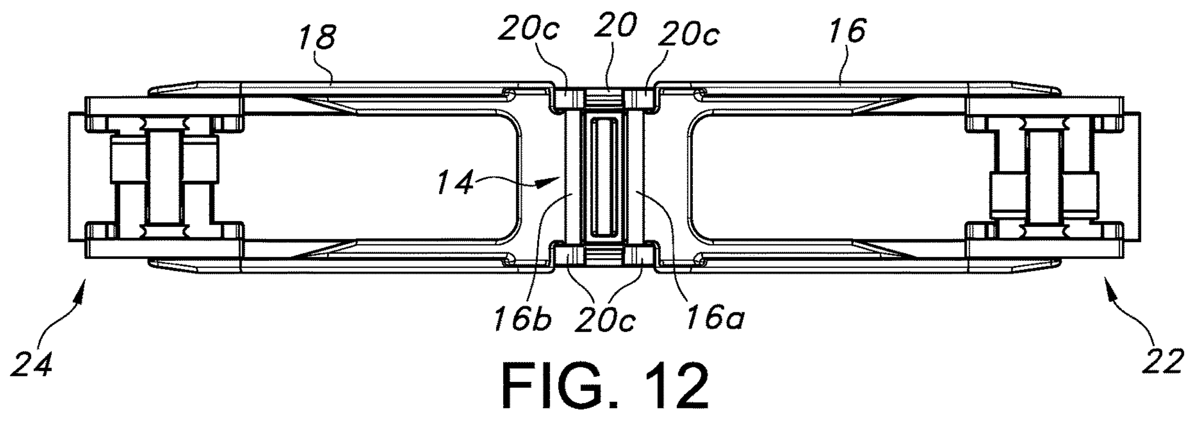
Figure 14:
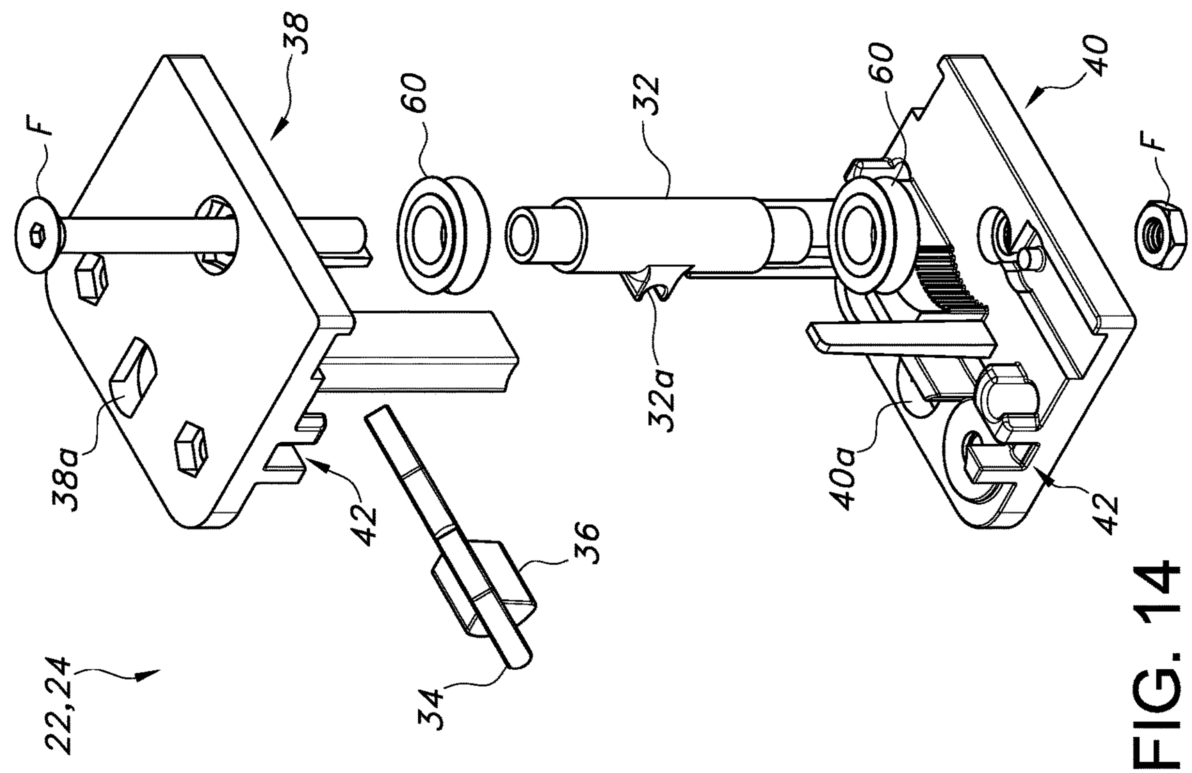
Figure 13:
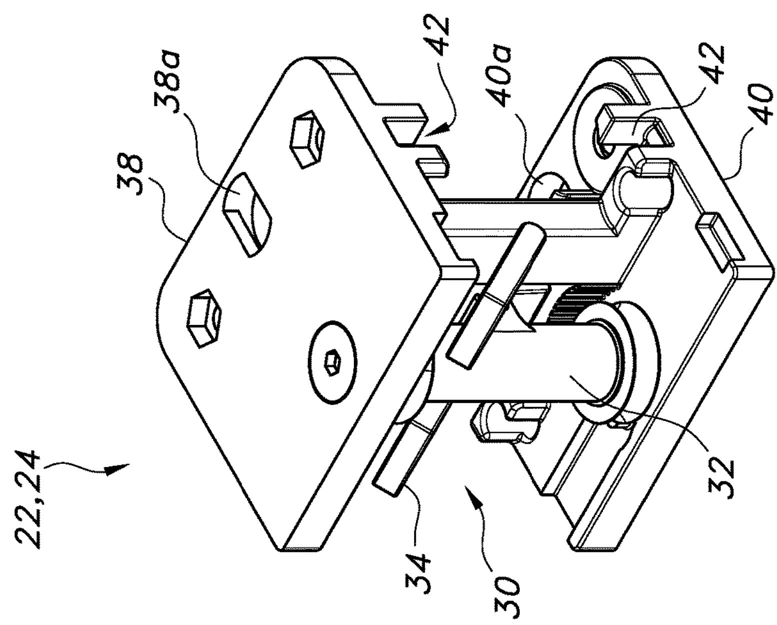
Figure 16:
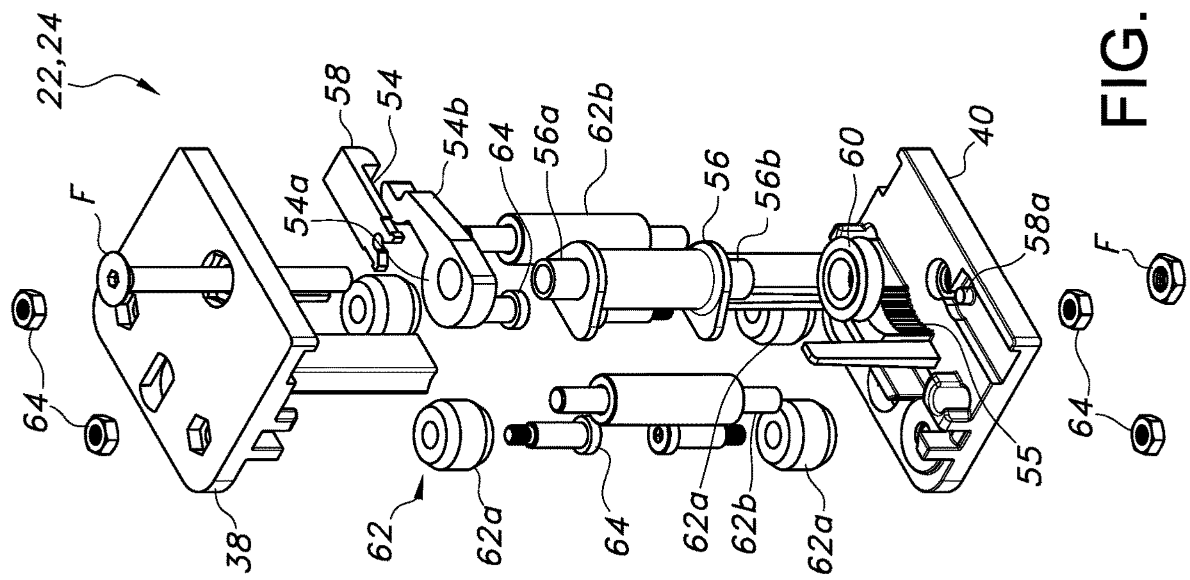
Figure 15:
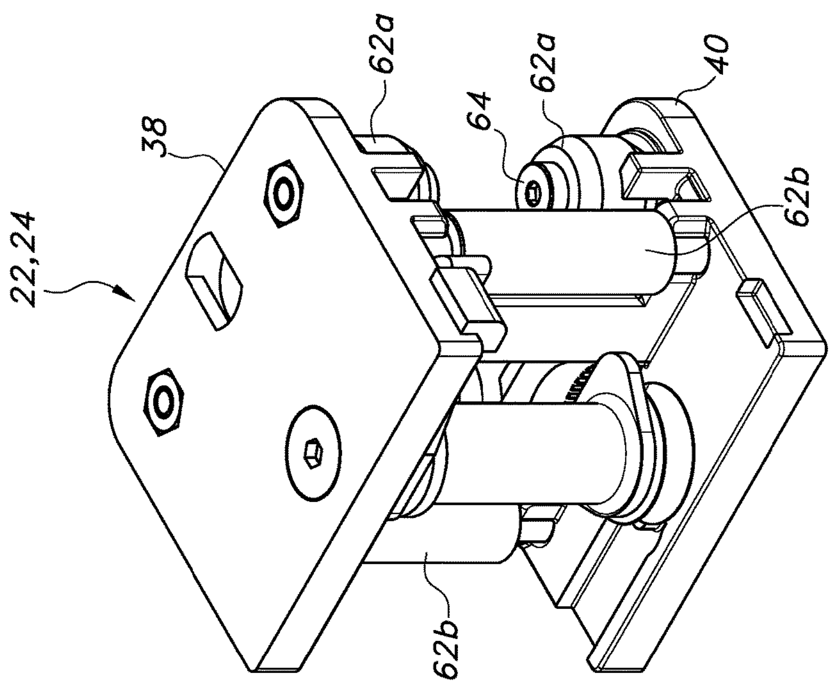
Figure 16A:
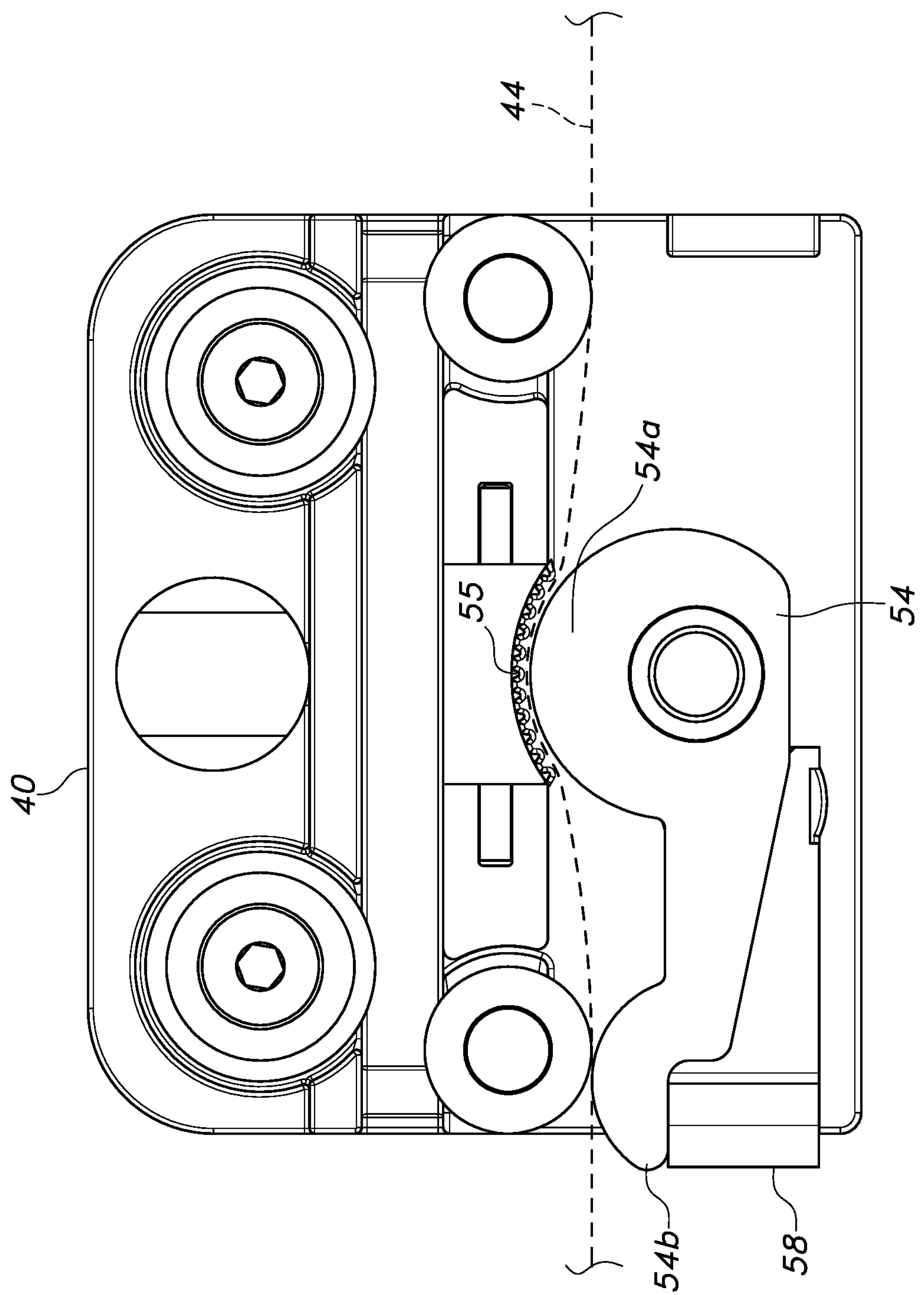
Figure 17:
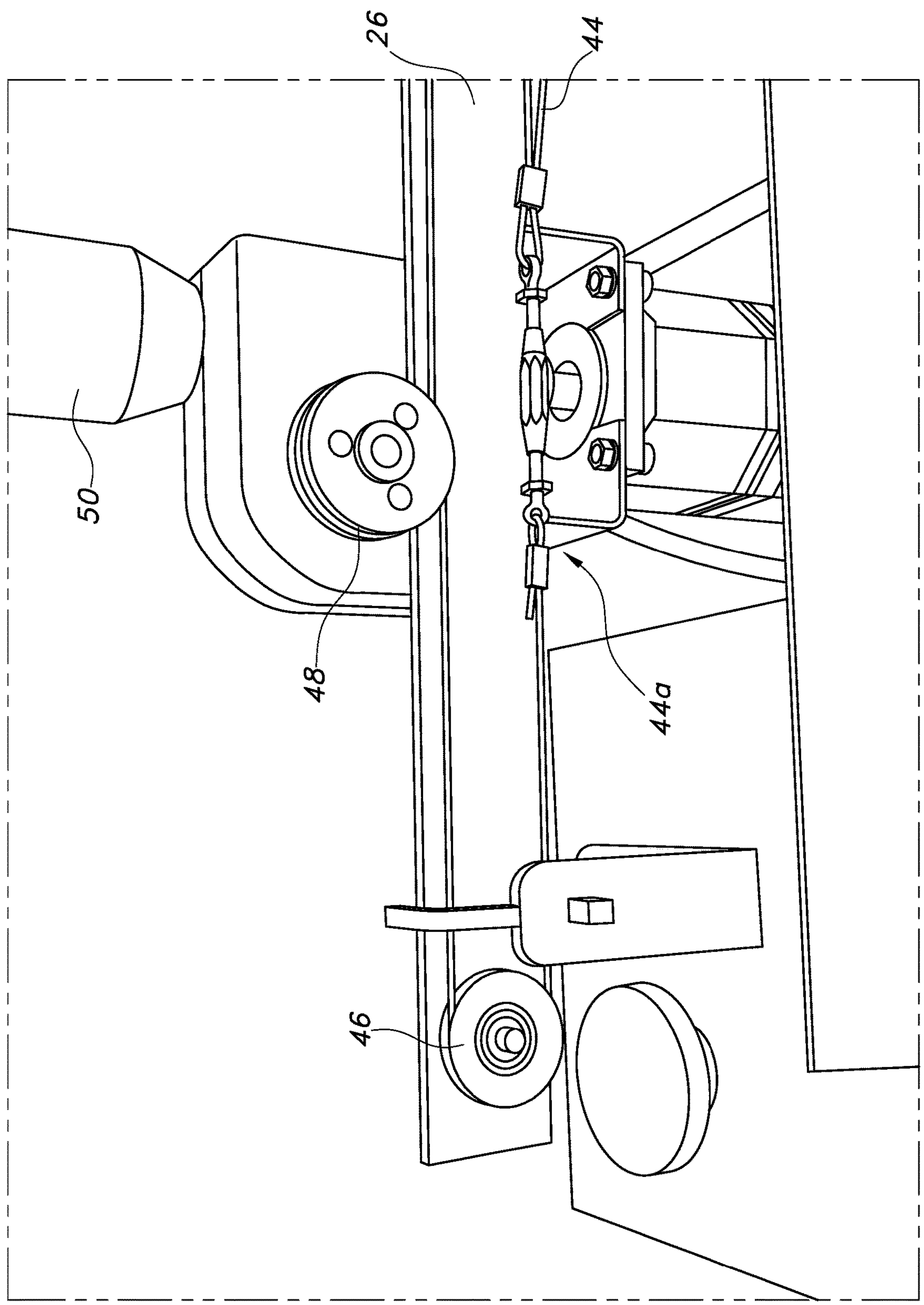
Figure 18:
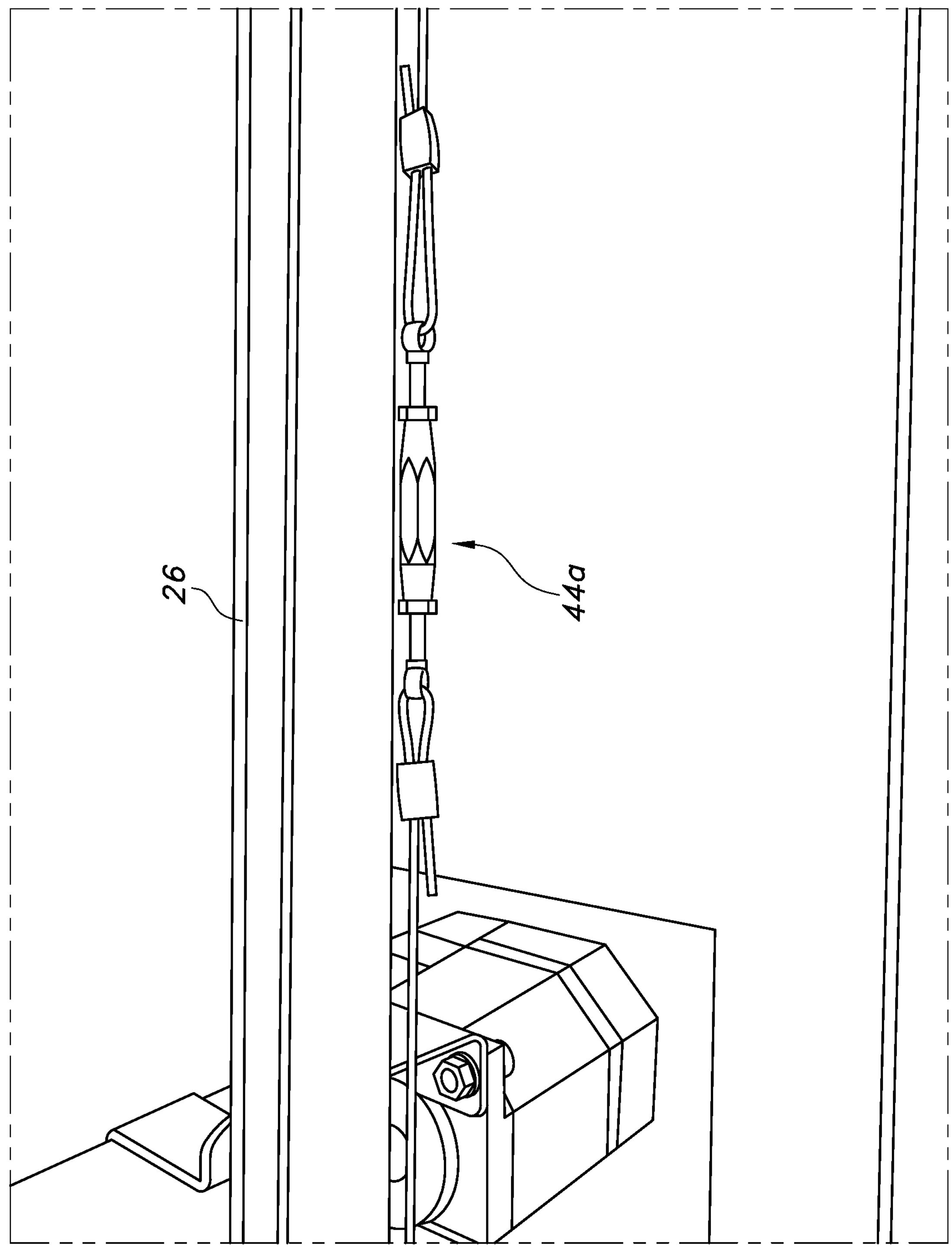
Figure 24:
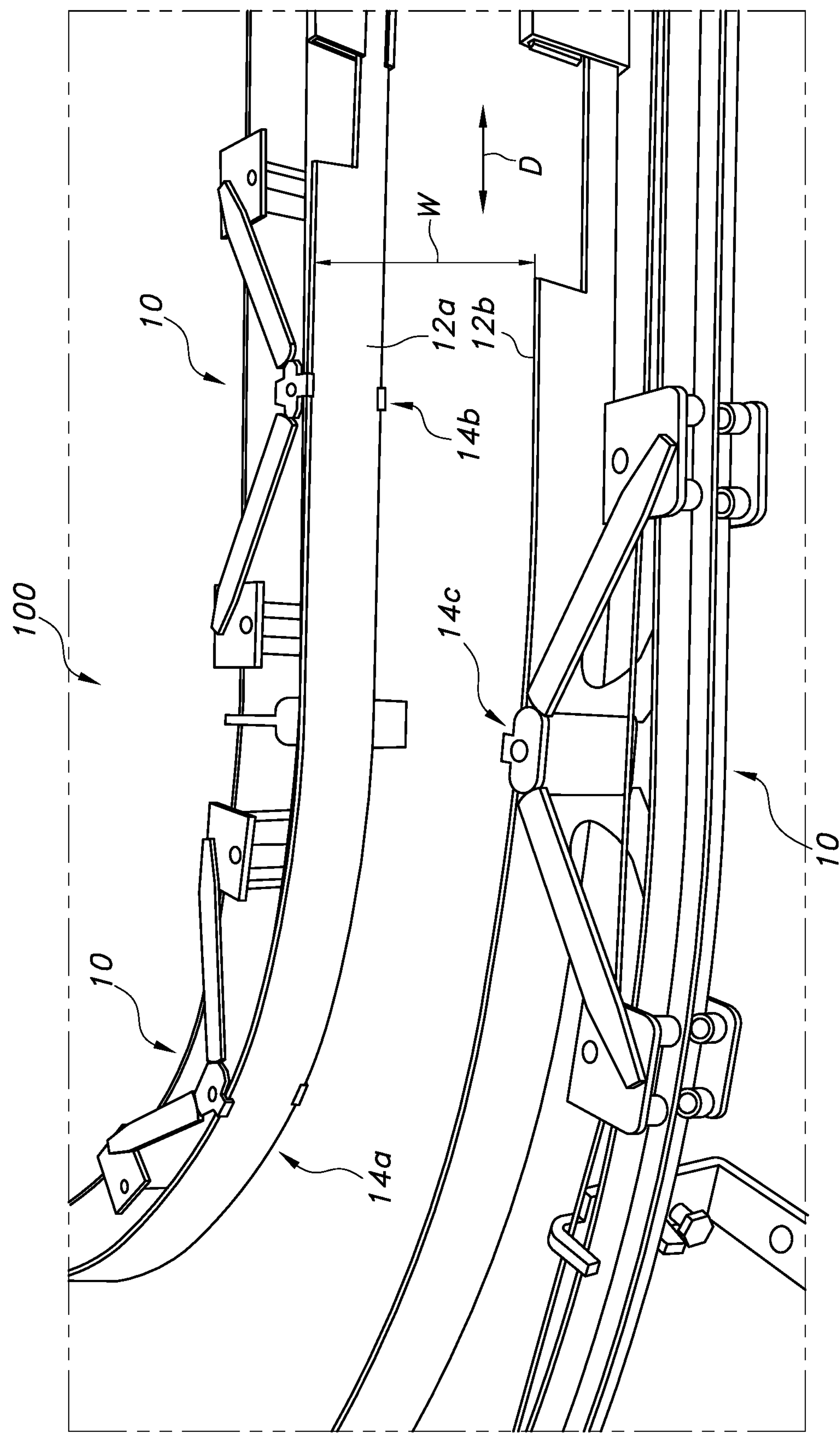
Figure 25:
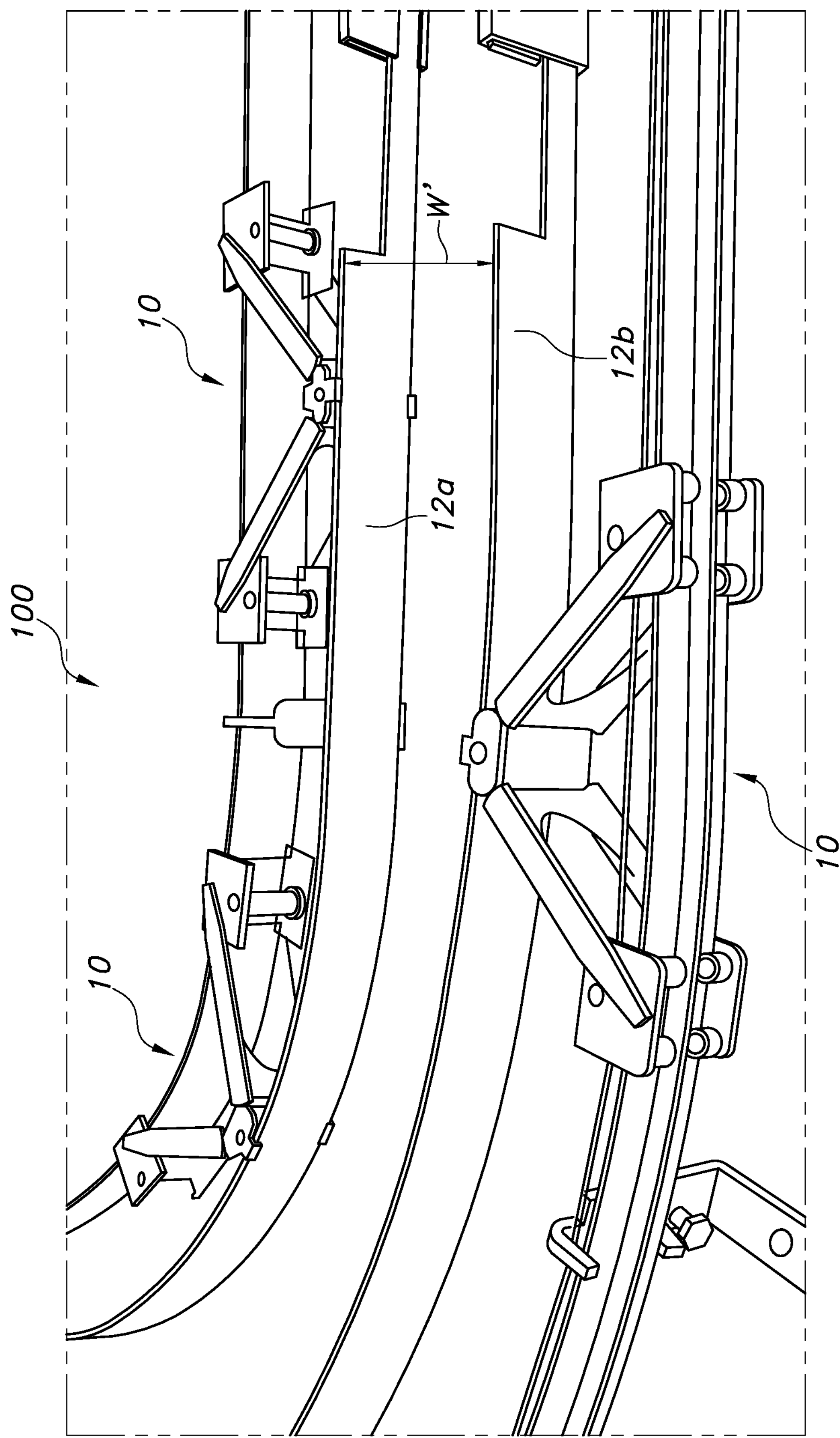
Figure 26:
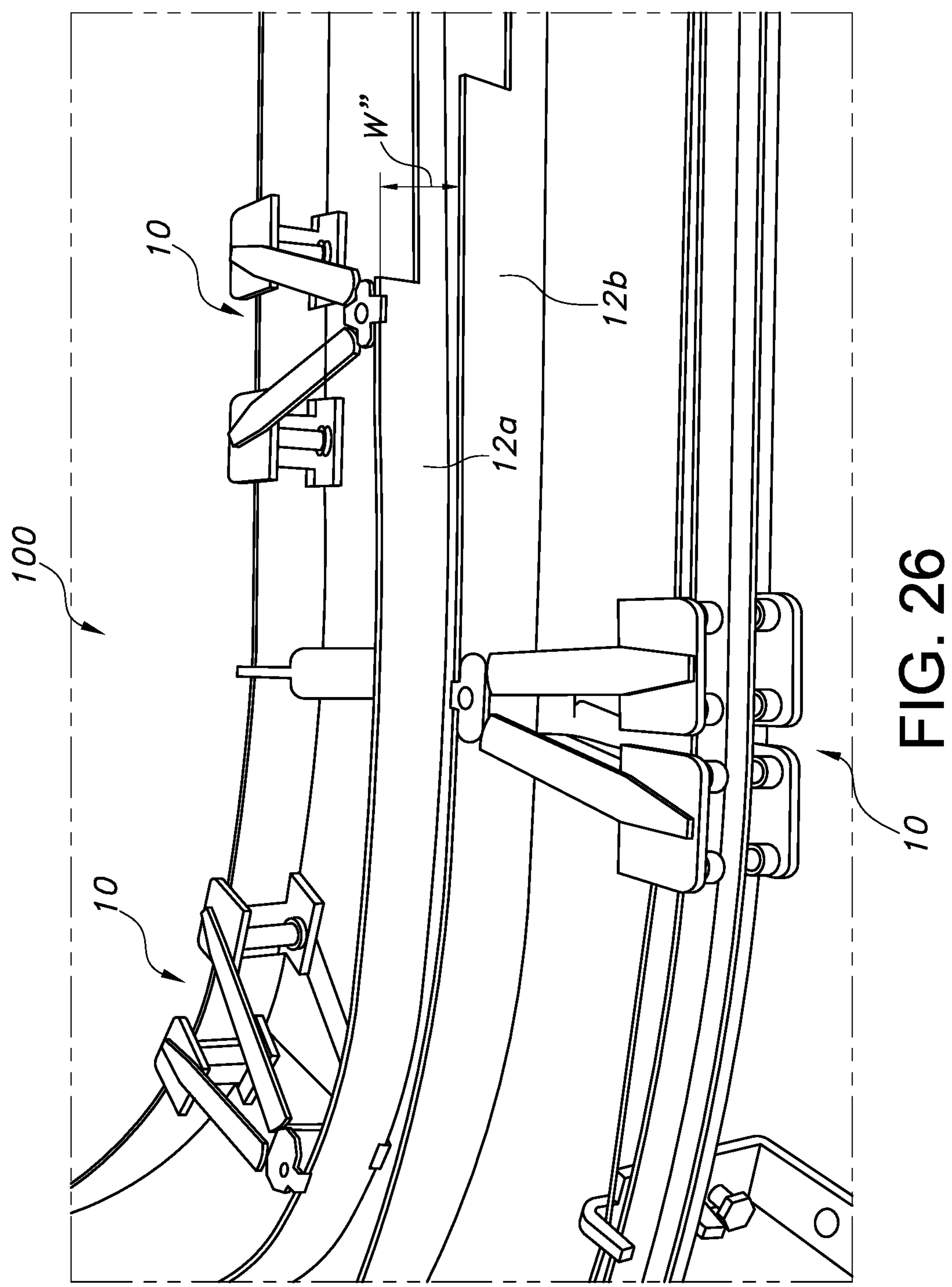
Figure 27:
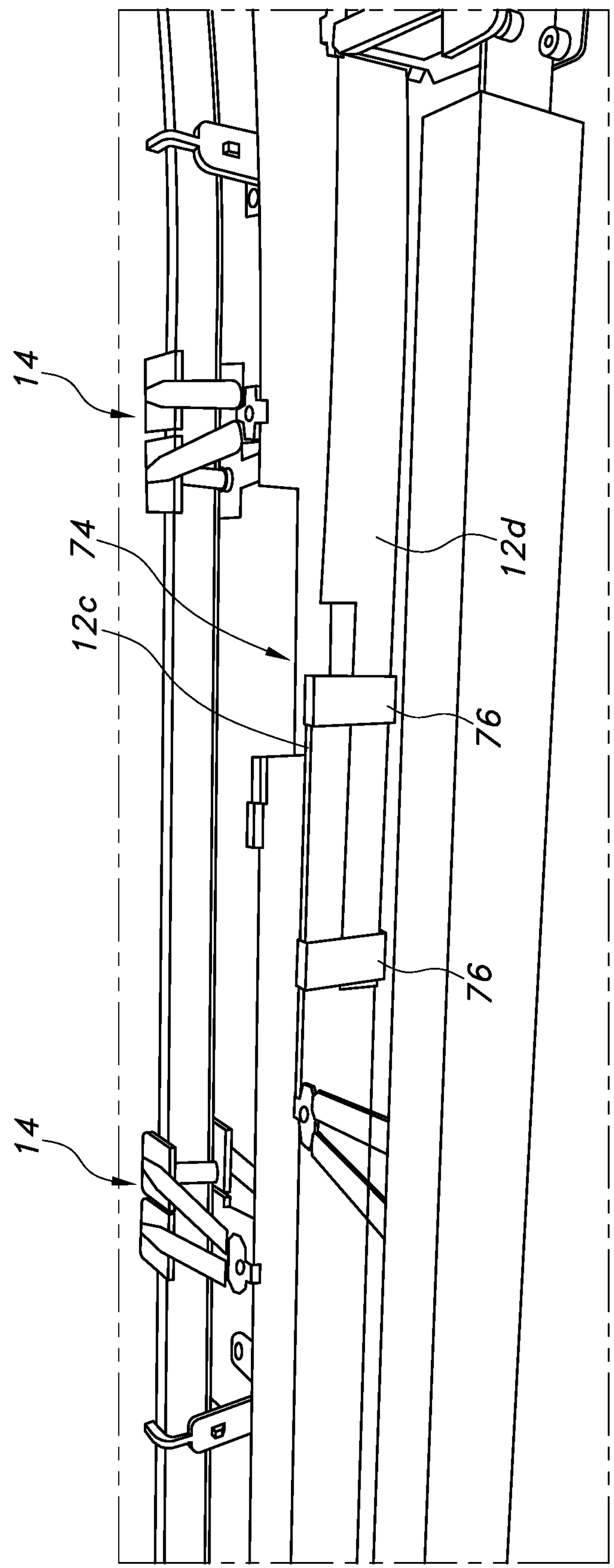
Figure 28:
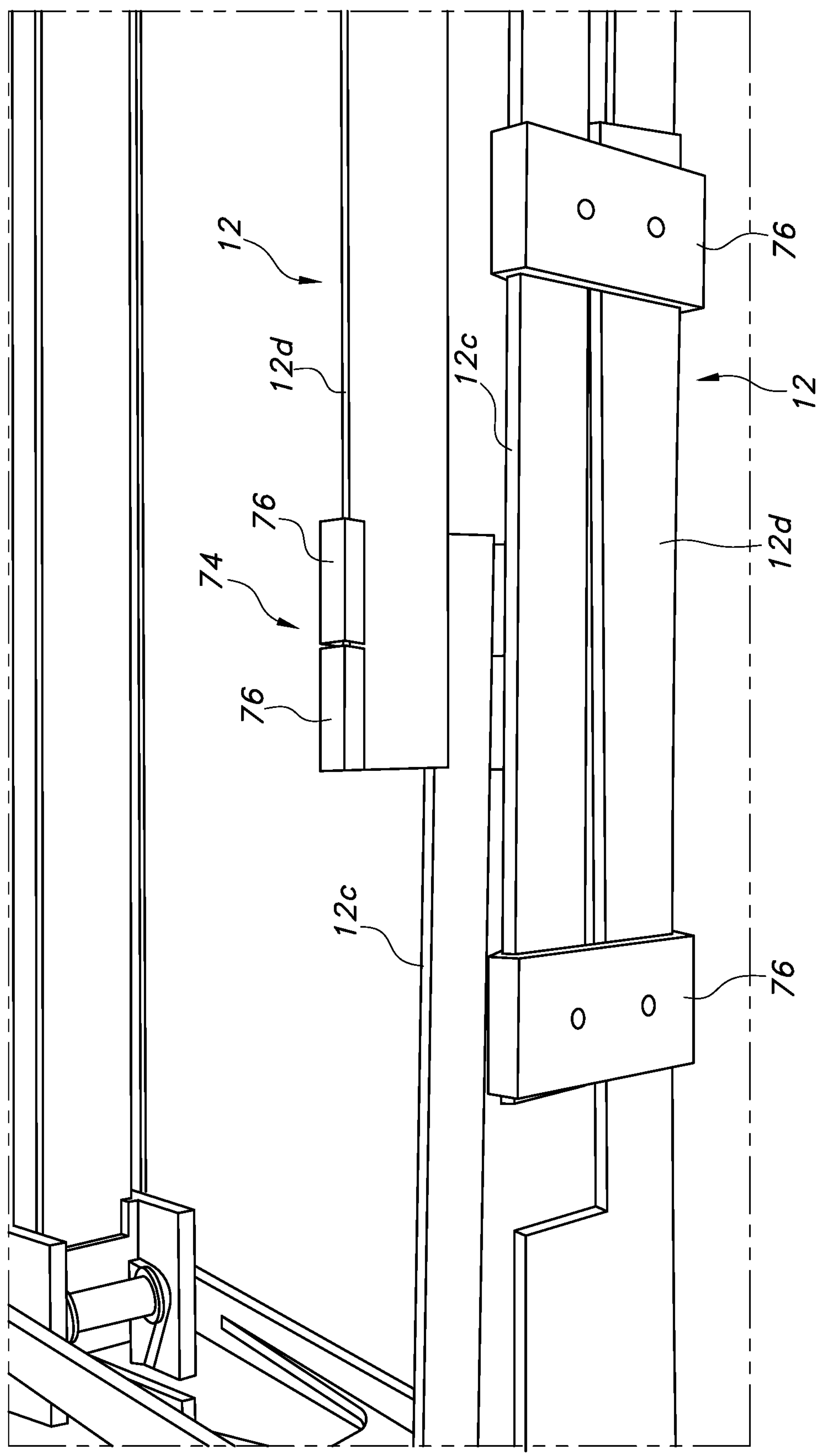
Figure 31:
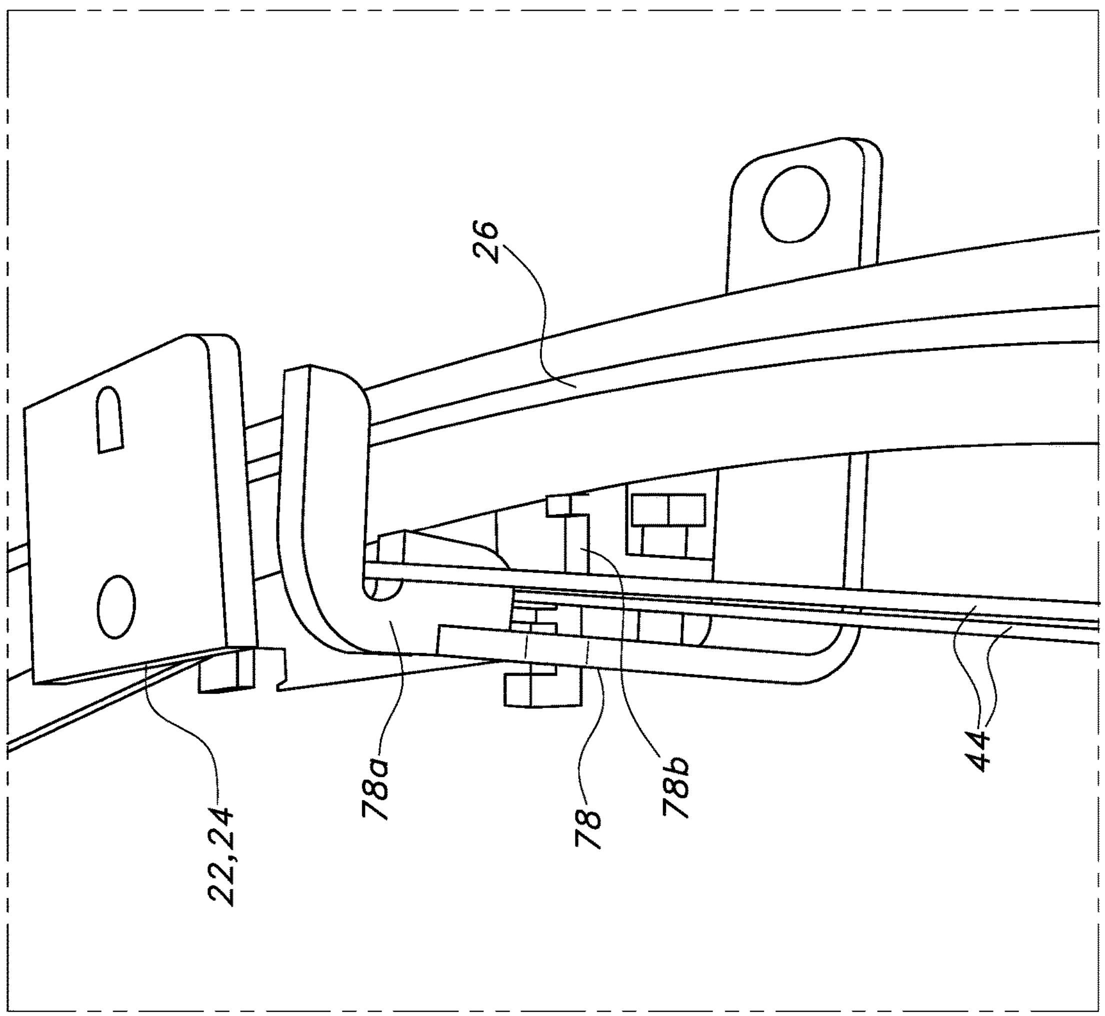
Figure 32:
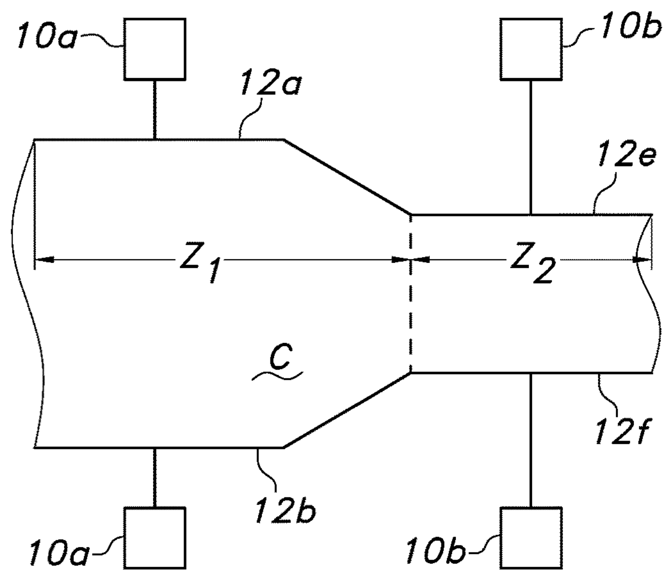
Figure 33:
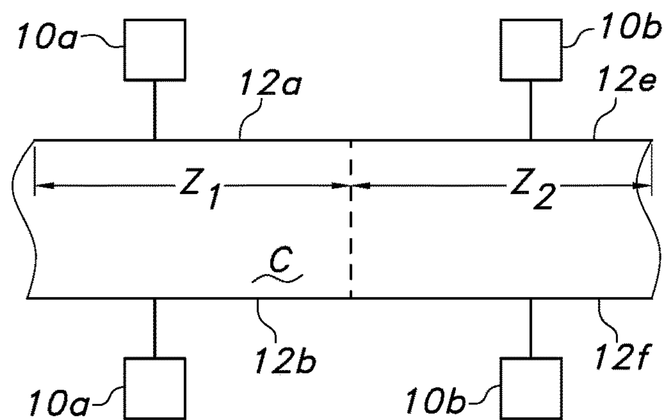
Figure 34:
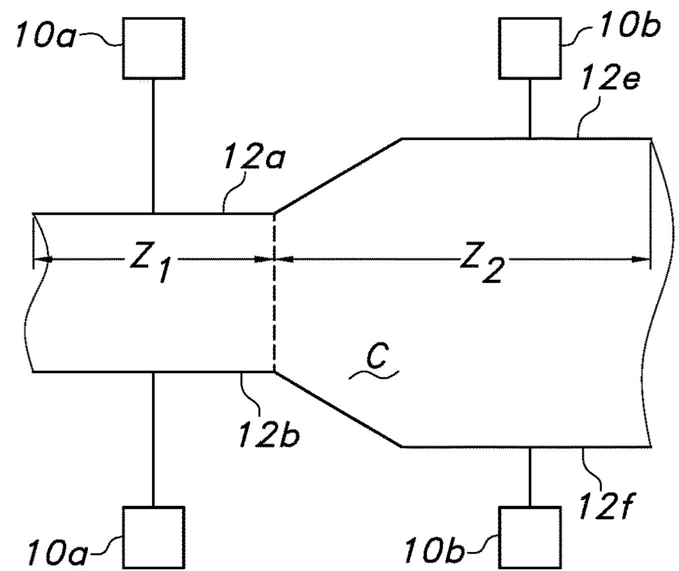

FIGS. 3, 4, and 5, are top, rear, and bottom views of the adjuster of FIG. 1;

FIG. 6 is a front view of the adjuster of FIG. 1;

FIGS. 7 and 8 are left and right side views of the adjuster of FIG. 1;

FIG. 9 is a perspective view of a collapsible guiderail support forming part of the adjuster of FIGS. 1-8;

FIG. 9A is an exploded view illustrating a manner of connecting an arm to one of the supports (shuttles) for pivoting movement;

FIG. 9B is a top view of the assembled configuration of FIG. 9A;

FIG. 9C is a cross-sectional view of the arrangement of FIG. 9A when assembled, taken along line 9C-9C of FIG. 9B;

FIGS. 10 and 11 are top views of the support of FIG. 9 in an extended and retracted condition;

FIG. 12 is a rear view of the support of FIG. 9;

FIG. 13 is a perspective view of a shuttle for connecting to the support for manual operation;

FIG. 14 is an exploded perspective view of the shuttle of FIG. 13;

FIG. 15 is a perspective view of a shuttle for connecting to the support for automated operation;

FIG. 16 is an exploded perspective view of the shuttle of FIG. 15;

FIG. 16A is a partially cross-sectional top view of the shuttle of FIG. 15;

FIG. 17 is a side view illustrating aspects of an actuator for actuating the adjustable guiderail support;

FIG. 18 illustrates a tensioner for a cable forming part of the actuator for the adjustable support;

FIGS. 19, 20, 21, 22 and 23 illustrate alternative forms of actuators;

FIGS. 24, 25, and 26 illustrate a system comprising two opposed guiderails associated with a plurality of adjusters;

FIGS. 27 and 28 illustrate various aspects of an extendable guiderail;

FIGS. 31 and 32 illustrate guides for guiding an endless cable along a curved section of a support rail for the adjusters; and FIGS. 32, 33, and 34 are schematic views illustrating the creation of various zones using the adjustable guiderails according to the disclosure.

Reference will now be made in detail to the present preferred embodiments of an adjustable guiderail for a conveyor, examples of which are illustrated in the accompanying drawing figures.

DETAILED DESCRIPTION

With reference to FIGS. 1-9, one possible embodiment of a guiderail adjuster 10 forming one aspect of the invention is illustrated. As illustrated, the adjuster 10 may be adapted to connect with a guiderail 12 for guiding articles along a conveying path and in a conveying direction D (see, e.g., FIG. 19). The guiderail 12 may be supported by a support 14 forming a part of the adjuster 10, which may be flexible or collapsible (that is, able to be folded into a more compact shape). The adjuster 10 including the support 14 is thus capable of extending or retracting the guiderail 12 to change the relative position of the conveying path, without increasing the overall width of the associated conveyor in a transverse direction as a result of the adjustment.

In one embodiment, the support 14 may comprise links in the form of first and second supports or arms 16, 18 connected to each other. The arms 16, 18 are rigid in the vertical direction, but pivotally connected at their inner end portions, such as by a connector 20. The arms 16, 18 and connector 20 thus create a linkage (which may be in the form of a two bar linkage, but other forms could be used).

At the opposite end, each arm 16, 18 is connected to a structural part designed to reduce or eliminate friction or provide support or bearing. In the illustrated embodiment, this structure takes the form of a movable bolster or shuttle 22, 24 adapted to frictionally (by sliding or rolling) engage an elongated support rail 26, which extends generally parallel with the guiderail 12 in the conveying direction D. Consequently, these connections and the relative movement established allow for flexing or collapsing of the support 14 in a direction transverse to the conveying direction D.

The support 14 is also adapted to connect with the guiderail 12. In the illustrated embodiment, this is achieved by providing the connector 20 with one or more receivers, such as clips 20_a_, 20_b_ (which as discussed in further detail below may provide engagement such that the guiderail 12 is fixed in position, or may be arranged to allow for relative sliding movement). As can be appreciated from FIG. 6, the arrangement is such that the overall adjuster 10 has a very low vertical profile, with a height only slightly greater than the height of the guiderail 12. As can be seen in FIGS. 1-8, an optional cover 28 may also be provided (removed in FIG. 9), which may engage the support rail 26 and provide a measure of protection for the movable parts of the adjuster 10, but without interfering with their relative movement and operation.

With reference to FIGS. 9 and 12, the nature of the pivoted connection of the arms 16, 18 forming the support 14 for the guiderail in one embodiment is shown. Each arm 16, 18 may be provided with a trunnion 16_a_, 18_a_, the ends of which are received and rotatably captured within upper and lower receivers 20_c_ on either side of the connector 20. However, alternative configurations could be used, such as a simple hinge (with a mechanical pin or a living hinge). In any case, movement of the shuttles 22, 24 along the support rail 26 towards each other causes the connector 20, and hence, the associated guiderail (not shown) to move along an adjacent conveying surface in a direction transverse to the conveying direction. The movement is considered a flexible one, in that the pivoting of the arms 16, 18 relative to the connection allows flexing of the flexible joint thus formed. Likewise, movement of the shuttles 22, 24 in the opposite direction (farther away from each other) causes the arms 16, 18 to flex relative to each other (and connector 20) and thereby retract the guiderail 12.

Allowing the arms 16, 18 forming the linkage to reach a "bottomed out" (β=180 degrees or more) and potentially locked position may be undesirable (especially when the actuation of the adjusters 10 is automated, as compared to manual). Thus, as can be appreciated from FIGS. 10 and 11, this condition may be avoided by providing the side of the connector 20 opposite the guiderail 12 with a protrusion or extension 20_d_ projecting transverse to the conveying direction, which thus serves to define the maximum flexing of the joint formed between the arms 16, 18. This protrusion or extension 20_d_ of the connector 20 may be sized and positioned to engage the support rail 26 in the fully collapsed position of the linkage, and thus prevent it from bottoming out and becoming locked in position. Of course, the protrusion could also be provided on one or both of the arms 16, 18, or even on the support rail 26, to achieve a similar result.

As can be appreciated with reference to FIGS. 10, 11, and 12, by way of being selectively extended or retracted, the support 14 creates an enhanced level of adjustability for an associated guiderail 12. The adjustments may be achieved in an easy and efficient manner, and without remarkably increasing the footprint of the overall conveyor system. Specifically, extending or retracting the support 14 allows the guiderail 12 pivotally attached thereto by virtue of connector 20 to be configured to provide a variable width conveying path for a number of differently sized articles to be conveyed. For example, when a smaller sized article is desired to be conveyed, the guiderail 12 need only be moved in an inward or inboard direction I transverse to the conveying direction D, thereby causing it to collapse in this direction (and thus causing the flexible joint to assume an acute angle $\alpha$, such as for example as little as 5 degrees in the illustrated example, and possibly lower in the event the arms 16, 18 may be arranged parallel to each other)). In other words, the arms 16, 18 move from a position where the relative angle between them is greater to one in which it is reduced or smaller. This narrows the conveying path, and thus allows for a readily customizable arrangement for guiding a variety of differently sized articles.

Likewise, if it is desired to convey a larger sized article/object or otherwise extend the width of the conveying path relative to the underlying conveyor, the guiderail 12 need only be moved in an outward or outboard direction O transverse to the conveying direction D (and thereby flexing the joint so as to create a large, obtuse angle $\beta$ between the arms 16, 18, which may be up to but not including 180 degrees, and as shown is limited by the presence of the protrusion 20*d* to prevent a lock out condition). In other words, the arms 16, 18 move from a position where the relative angle between them is smaller to one in which it is greater. In all cases, it can be appreciated that no rod or like structure projecting outwardly from the support rail 26, and thus the overall width of the arrangement does not change as a result of the extension or retraction. The resulting conveyor system may thus have a smaller footprint than would otherwise be the case if transversely extending rods and corresponding mounts were utilized.

The adjustment of the support 14 may be manually or automatically done. In the manual version, and with reference to FIGS. 13 and 14, each shuttle 22, 24 may be provided with a retainer 30 for use in selectively engaging the support rail 26 and thereby holding the shuttle in the desired position. In the illustrated embodiment, the retainer 30 comprises a post 32 supporting a pivotally mounted lever 34, such as by way of snap-fit engagement with a clip 32*a*. The inside of the lever 34 includes a wedge 36, which is sized and positioned for not engaging the rail 26 in one position, but frictionally engaging it in a different position (note positions 34' (free) and 34" in FIG. 9 (retained)). Opposed plates 38, 40 may be retained by a fastener F to hold the post 32 in position, and each plate 38, 40 may include a guide 42 for slidably receiving a portion of the support rail 26. The plates 38, 40 may also include apertures 38*a*, 40*a* for receiving a corresponding fastener (such as a keyway plug 16*c*; see FIGS. 9A, 9B, and 9C) depending from a proximal end of each arm 16, 18 for pivotally connecting the ends of the arms 16, 18 with the shuttles 22, 24.

As can be appreciated, by disengaging the retainer 30 using lever 34, the associated shuttle 24 is free to move to and fro, such as by sliding, along the support rail 26, and thereby extend or retract the support 14 and, hence, the associated guiderail 12. When a position is reached corresponding to the desired extension or retraction of the guiderail 12, the retainer 30 may be reactivated to establish fixed engagement with the support rail 26. As can be appreciated, it is only necessary to move one of the shuttles 22, 24 to achieve the desired extension or retraction of the guiderail 12 in view of the collapsible nature of the support 14 created by the pivotably connected arms 16, 18.

The shuttles 22, 24 may also be readily adapted to work in an automated environment. Specifically, at least one, and potentially each shuttle 22, 24 may be adapted to engage an actuator for causing movement to and fro along the support rail 26, depending on the degree of actuation, and thus extending or retracting the arms 16, 18. As shown in FIG. 17, the actuator may comprise a connector for connecting with the shuttles 22, 24, such as a flexible cable 44. The cable 44 may extend over pulleys 46 at each end (only one shown in FIG. 17 mounted to one end of the support rail 16, but the arrangement would essentially be the same as shown at the opposite end of the support rail 26; see, e.g., FIG. 19). The arrangement thus forms an endless loop (which may be associated with plural adjusters 10, as outlined further in the following description).

To cause the cable 44 to traverse the endless path, it may be entrained around a driver, such as capstan 48, which may be associated with a motor 50 (e.g., a servomotor) also forming part of the actuator in this embodiment. As shown in FIG. 18, the cable 44 may also be provided with a tensioner, such as a turnbuckle 44*a*, to allow for the tension to be adjusted as necessary or desired.

In this example, and with reference to FIG. 16, each plate 38, 40 may be provided with a retainer 52 for selectively engaging the cable 44. The retainer 52 may comprise a clamp in the form of a pivotable cam 54 (only upper one shown in FIG. 16), but could take other forms as well (e.g., a bolt with a flange for capturing a portion of the cable 44 against a corresponding surface of the shuttle). The cam 54 may be journaled on a reduced diameter end 56*a* of a post 56, which may be held in place by a fastener F.

In the illustrated example, and with reference to FIGS. 16 and 16A, the cam 54 includes an enlarged, rounded inner face 54*a* for engaging and pressing the cable into engagement with a frictionally enhanced portion 55 of the plate 38, 40 (which may be identical, but inverted; in other words, plate 38 is identical in form to plate 40 in FIG. 16, so it can be understood that the upper plate includes frictionally enhanced portion 55), and a free end 54*b* adapted for tactile engagement for movement between the hold and release position. A lock, such as a removable locking tab 58 with flexible legs for engaging a projection 58*a* in a snap fit engagement, may also be provided for engaging and fixing the cam 54 in the locked or closed condition, thus engaging the cable (shown in phantom line in FIG. 16A). A roller or pulley 60 may be rotatably journaled at the opposite, reduced diameter end 56*b* of post 56 (upper when the cam 54 is at the lower plate 38; lower when the cam 54 is at the upper plate 38, as shown in FIG. 16).

As can be appreciated, the cable 44 has a forward run and a return run in view of the endless loop established. By connecting one shuttle 22 to the upper run using the clamp (cam 54) located as shown in FIG. 16, and connecting the other shuttle 24 to the return run using a clamp (cam 54 on plate 40, as per FIG. 16A) at a corresponding location, actuation using a single actuator thus causes the shuttles 22, 24 to move toward or away from each other, thereby flexing the joint of the support 14 created by arms 16, 18 and extending or retracting the guiderail 12. The alternate run of the cable 44 that is not fixed to the shuttle 22, 24 simply engages the roller/pulley 60, and thus does not impede the relative movement.

With continued reference to FIG. 16, each shuttle 22, 24 may also be provided with rollers 62 to create low-friction engagement with the support rail 16. The rollers 62 may comprise individual rollers 62*a* connected to the plates 38, 40 by fasteners 64 and arranged for engaging an outer face of the support rail 16, as well as rollers 62*b* journaled in the plates 38, 40 for engaging the inside face of the support rail 16. As can be appreciated, the spaced rollers 62*a* allow for a portion of the rail 16 to pass for engaging and supporting the cover 28.

Figure 19:
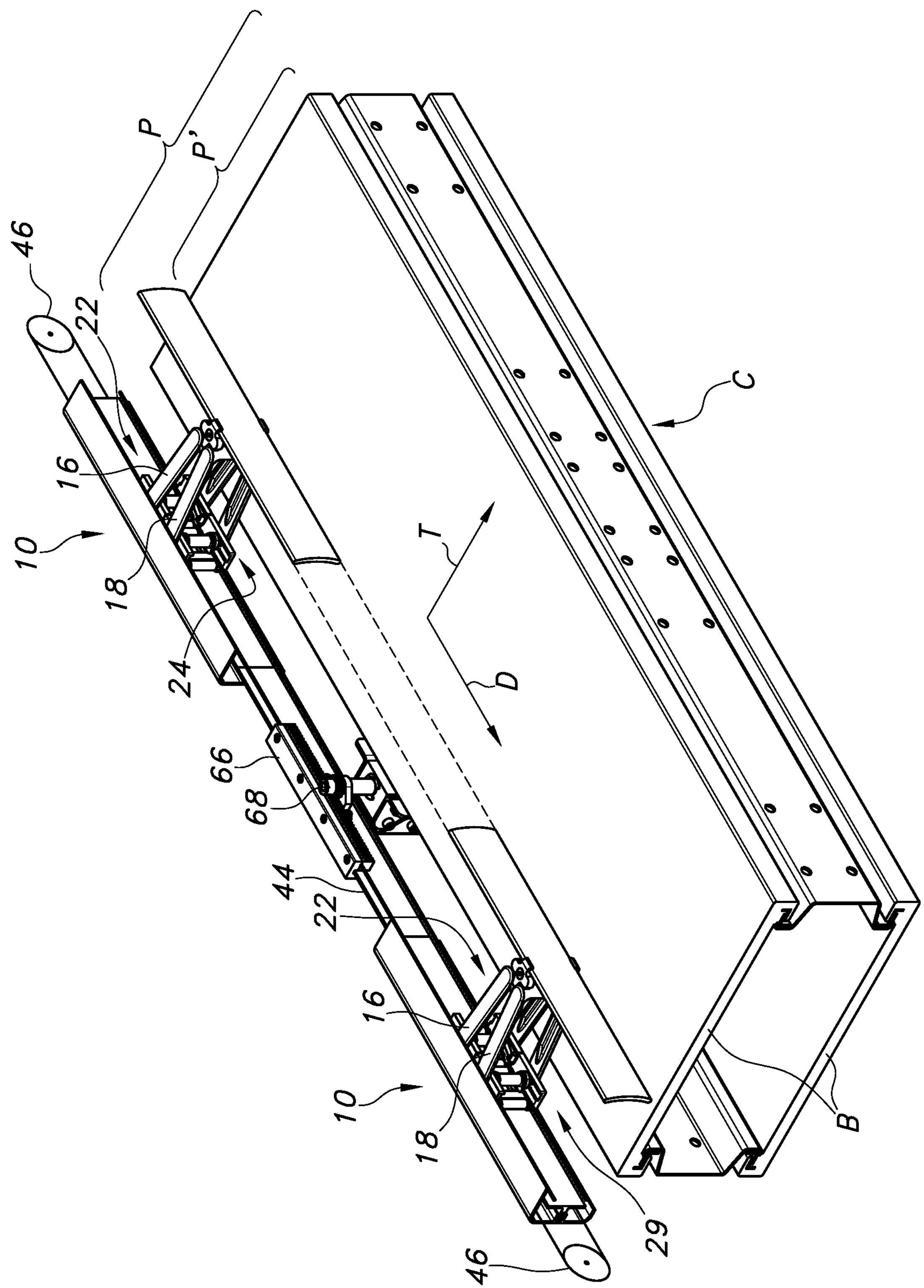

Alternative forms of actuation are possible, which advantageously may use a single actuator for activating plural adjusters 10 for adjusting the width of the conveying path. For example, as shown in FIG. 19, the connector, such as cable 44, may be associated with a rack 66, which is arranged for engaging a rotatable pinion 68. In view of the endless nature of the cable 44, and the corresponding connections with the shuttles 22, 24 as described above, actuation of the pinion 68 in one direction causes the simultaneous actuation of plural adjusters 10. This advances the guiderail 12 (shown as two disconnected portions with phantom portion for purposes of illustration) in the transverse direction T of the conveyor C (which as indicated has a conveying path P formed by a conveying surface (chain or belt B) in the conveying direction D, and note reduced width path P' as a result of the advance of the guiderail 12 in the transverse direction). Specifically, rotating the pinion in a clockwise direction moves the rack to the right in FIG. 19, and in view of the connection of the forward run of the cable 44 with shuttles 22 of each guiderail adjuster 10, and the return run with shuttles 24, causes the advancement illustrated. Reversing the direction of rotation of pinion 68 causes the opposite movement to occur.

Figure 20:
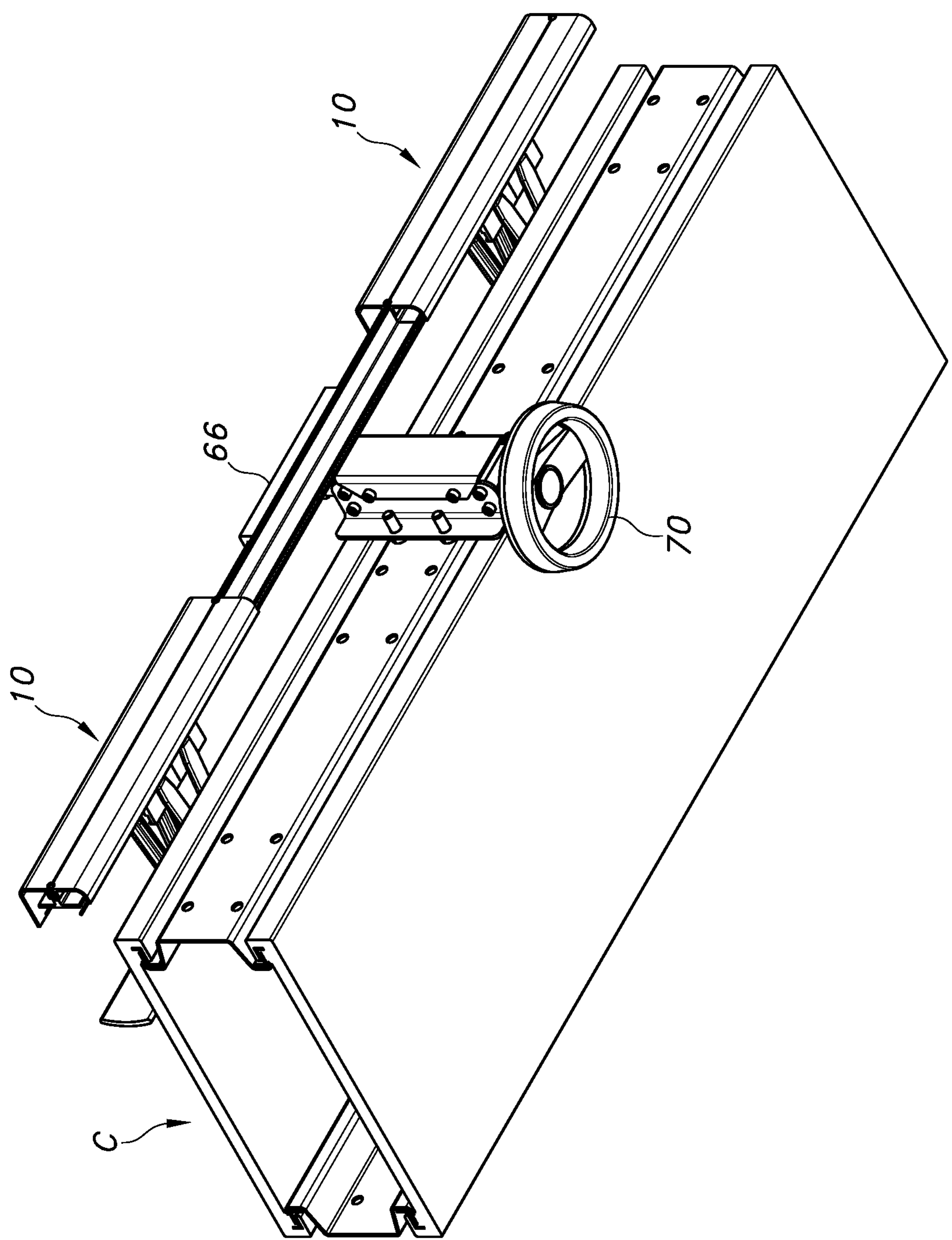
Figure 21:
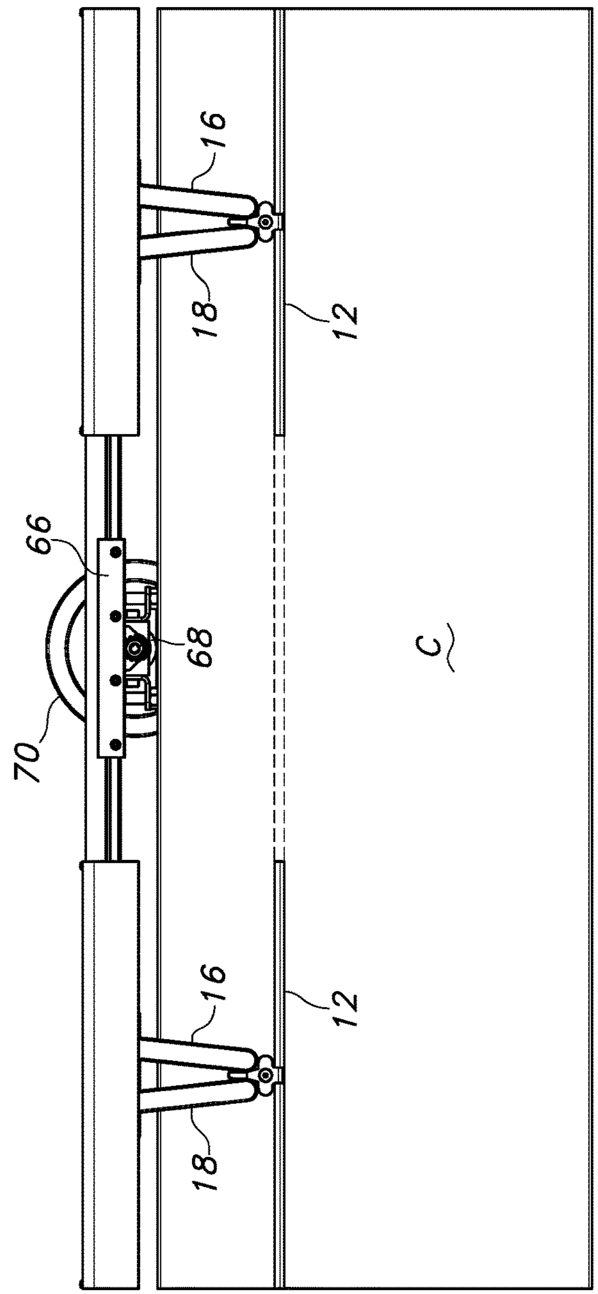
Figure 22:
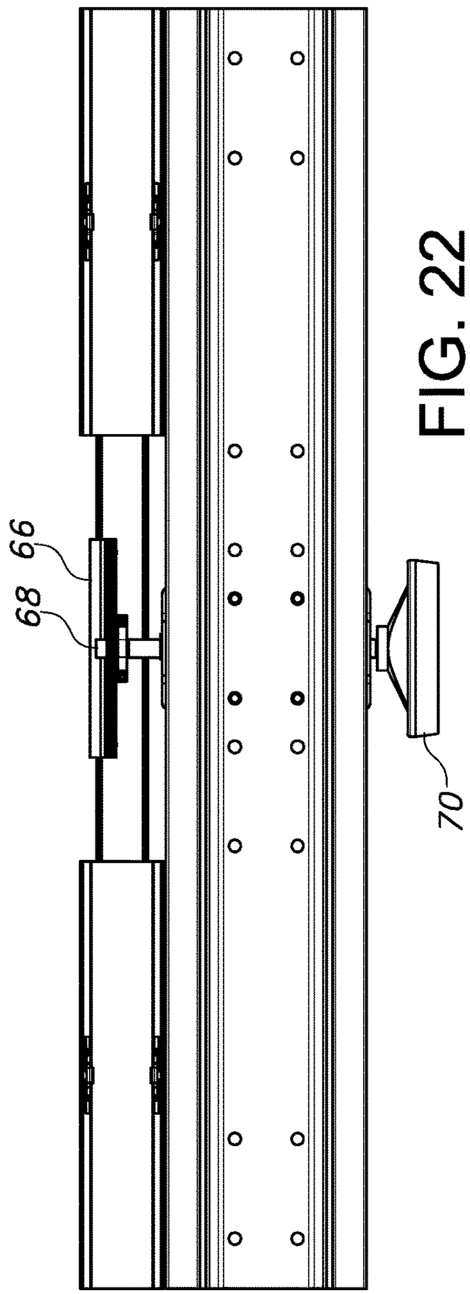
Figure 23:
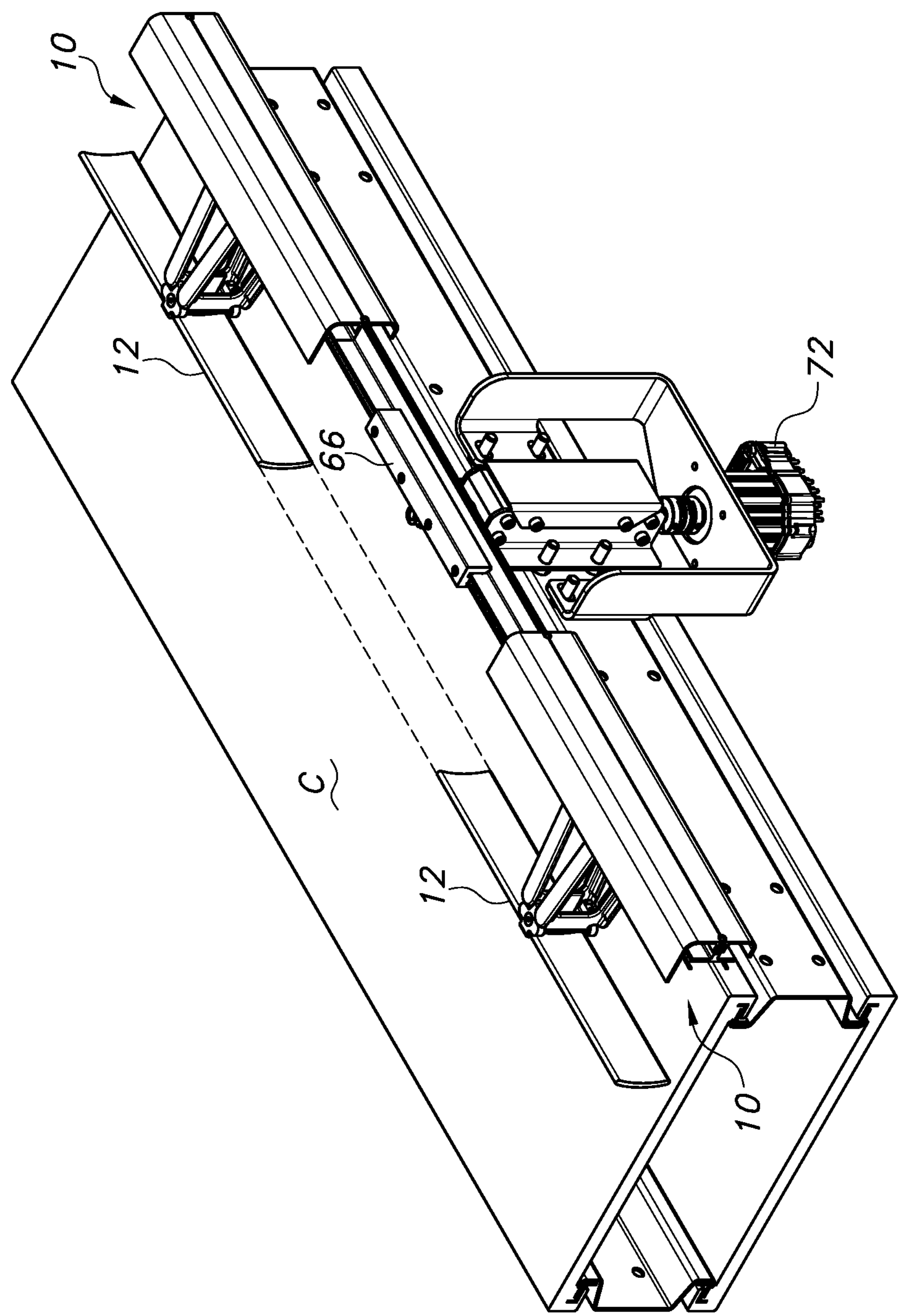

The actuation of the adjusters 10 associated with the conveyor C may again be manual or automated. Thus, as shown in FIGS. 20-22, a hand wheel 70 may be connected to the associated conveyor C and rotated to cause the actuation of one or more of the adjusters 10 (basically, as many as are connected to a single connector or cable 44, which could be any number (2, 5, 10, 20 or more), depending on the strength of the actuator arrangement used. FIG. 23 illustrates the use of a motor 72 (e.g., servomotor) for automated operation.

FIGS. 24-26 illustrate an overview of a possible arrangement of the adjustable guiderail support system 100 incorporating a plurality of adjusters 10 for use in connection with a conveyor having a conveying path (not shown). Opposed inner and outer guiderails 12*a*, 12*b* are shown for guiding articles (not shown) along the conveying path. The adjustable guiderail supports 14*a*, 14*b* are supporting inner guiderail 12*a* and the adjustable guiderail support 14*c* is supporting outer guiderail 12*b*. Thus, if it is desired adjust the conveying path width W to accommodate differently sized articles (or groups thereof), guiderail 12*a* (along with guiderail supports 14*a*, 14*b*) and guiderail 12*b* (along with guiderail support 14*c* and any others present) may be moved. The movement may again be manual or automatic using a single actuator (including cable 44) transverse the conveying direction D along each support rail 26 (with an associated motor, the operation of which may be coordinated by a single controller) in order to widen or narrow the conveying path width W (note smaller width W' in FIG. 25, and even smaller width W" in FIG. 26, which may correspond to a single row of articles being conveyed, such as bottles or cans). In such situations, it may be desirable to have the receivers (e.g., clips 20*a*, 20*b*) firmly engage the guiderail 12*a*, 12*b* at every other adjuster 10, but slidably engage at others, to allow for the desired extension and retraction.

FIGS. 27-28 illustrate that the guiderail 12 may comprise an extendable joint 74 comprised of portions, such as legs 12*c*, 12*d*, having a reduced vertical dimension (basically each equal to one half of the overall guiderail height). These legs 12*c*, 12*d* may overlie each other or overlap in a vertical direction, and are slidably received in receivers 76, which may take the form of C-shaped clamps that allow for relative movement of the legs (toward a common center during retraction of the guiderail 12 and away from it during extension). The receivers 76 thus retain the legs 12*c*, 12*d* together, yet capable of relative movement in the conveying direction during extension and retraction of the associated guiderail portions. This allows for the guiderail 12 to provide the desired extension and retraction, such as via supports 14, to accommodate a particular article being conveyed or form a particular conveying path. Hence, one or both of the legs 12*c*, 12*d* may be curved, but use of the supports 14 in connection with straight portions that are connected by the extendable joints is also possible. It can also be appreciated from FIG. 28 that the extendable joints 74 allow for opposing guiderails 12 to extend or retract different amounts, which may occur when one is associated with an inside curve and the other with an outer curve.

Figure 29:
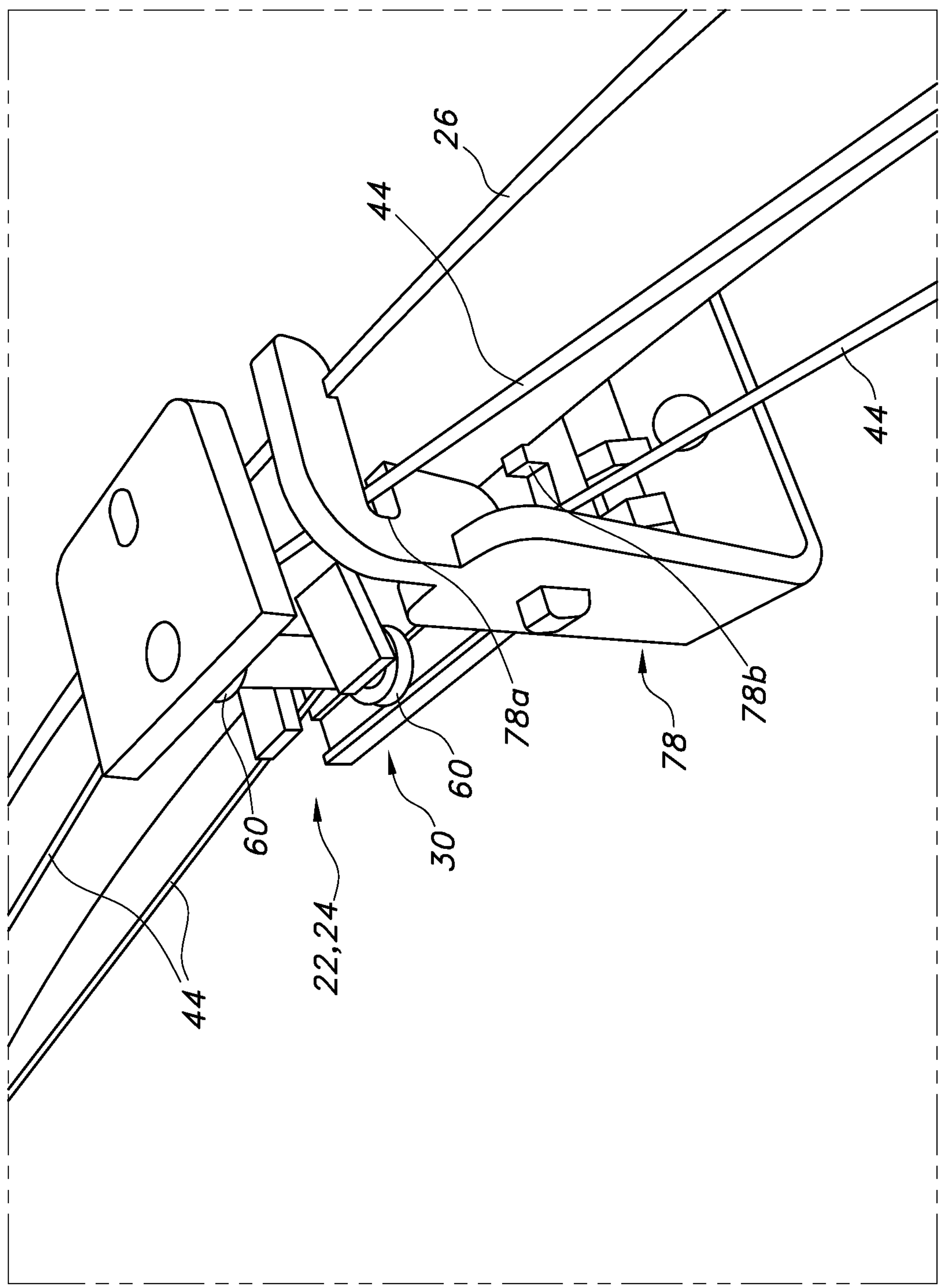
Figure 30:
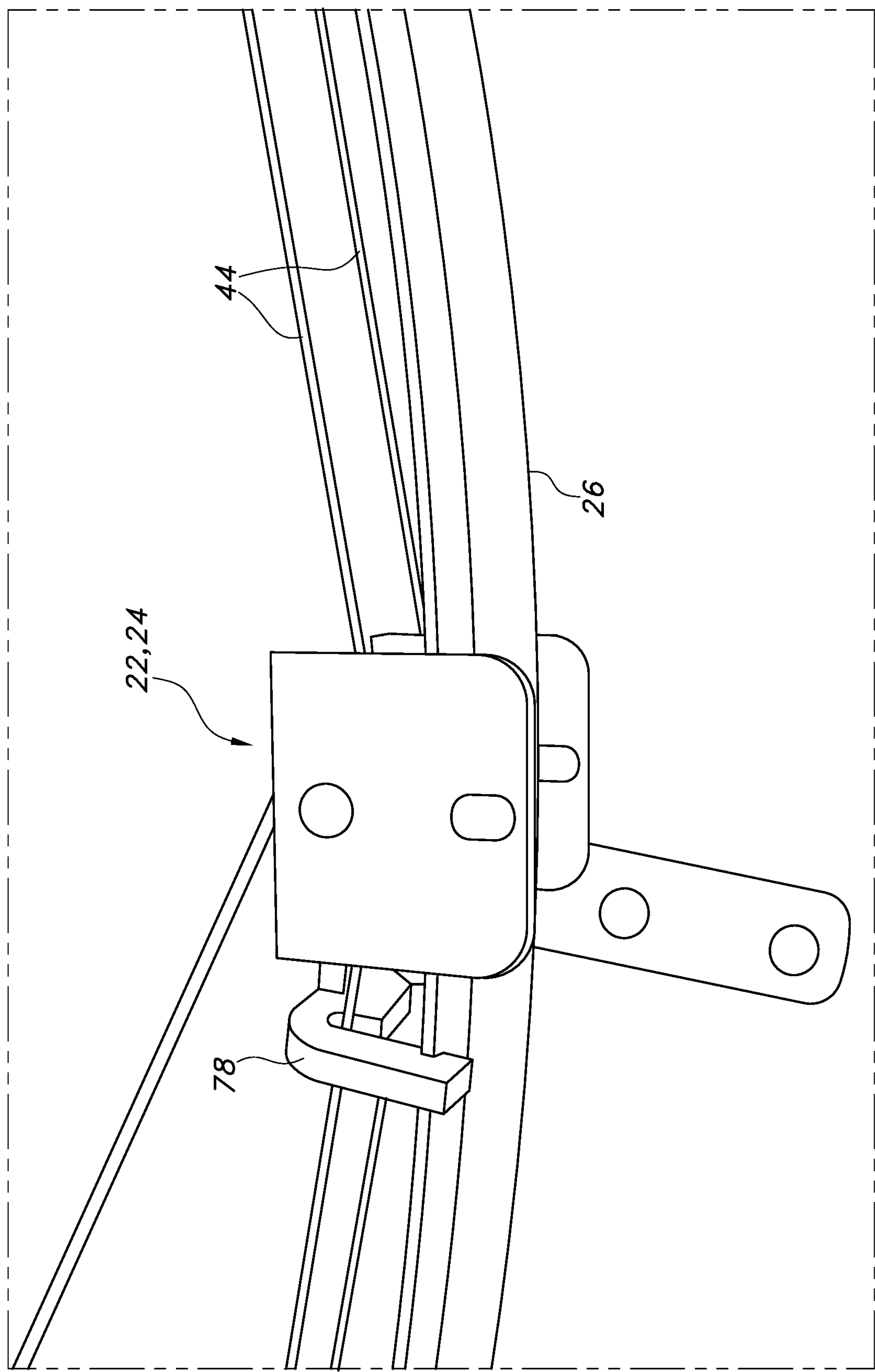

Depending on the size or shape of the underlying conveyor C, it may also be desirable to provide a guide intermediate the adjusters 10 for guiding the connector, such as cable 44. As shown in FIGS. 29-31, this may be achieved using the manual shuttle 22 or 24 of FIGS. 13 and 14, which may be equipped with pulleys 60 for engaging the upper and lower runs of the cable 44. The shuttles 22, 24 may be selectively positioned using the associated retainers 30. Stationary brackets 78 may also be provided with upper and lower guides 78*a*, 78*b* for guiding the respective runs of the cable 44.

FIGS. 32-33 schematically illustrate a possible application of the adjusters 10 to create zones of different widths in a single conveyor or conveyor system (e.g., comprised of multiple conveyors). As shown in FIG. 32, a first series of adjusters 10*a* associated with an underlying conveyor C may be used to provide an upstream portion of the conveyor with guiderails 12*a*, 12*b* spaced farther apart, thus forming a first zone Z1, and a second series of adjusters 10*b* may be used to place downstream guiderails 12*e*, 12*f* spaced closer together, thus forming a second zone Z2. The adjusters 10*a*, 10*b* may be manually adjusted, or associated with different actuators (e.g., a cable system, as described above). Later in time, as indicated in FIG. 33, the adjusters 10*a*, 10*b* may be altered to make the zones Z1, Z2 the same width, or for zone Z2 to be wider than zone Z1, as indicated in FIG. 34. As can be appreciated, the material of the guiderails 12*a*-12*b* may be flexible or include flexible interconnections (including the joints 74 described above) to allow for the relative movement, which is exaggerated in the schematic figures for purposes of illustration).

The foregoing descriptions of various embodiments of an adjustable guiderail and related methods provide illustration of the inventive concepts. The descriptions are not intended to be exhaustive or to limit the disclosed invention to the precise form disclosed. Modifications or variations are also possible in light of the above teachings. For instance, the connector forming a part of the actuator may comprise a flexible ribbon, which may be manually actuated by a lever. While the shuttles 22, 24 are shown as overlying and sliding upon the support rail 26, the shuttles could also be recessed within cavities in the support rail 26, while still functioning as shuttles. The shuttles may also take different forms, such as for example elongated flexible ribbons connected to the arms 16, 18 and designed to move along the support rail 26 or within a cavity formed therein. Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, shapes, materials, or combinations thereof. The terms "substantially," "about," or "approximately" are meant to mean as close to the corresponding condition as reasonably possible, and typically not varying from it by more than 10%, unless circumstances indicate otherwise. Any species element of a genus element can have the characteristics or elements of any other species element of that genus. The term "comprising" is not meant to be limiting. The above-described configurations, elements or complete assemblies and methods and their elements for carrying out the invention, and variations of aspects of the invention can be combined and modified with each other in any combination.

The invention claimed is:

1. An apparatus for supporting a guiderail for guiding one or more articles conveyed along a conveyor having a conveyor surface defining a conveying path in a conveying direction, said conveyor surface further defining a plane of the conveyor, the apparatus comprising:

a support rail; and at least one adjuster for adjusting a position of the guiderail relative to the conveyor in a direction transverse to the conveying direction and generally parallel with the plane of the conveyor, the at least one adjuster comprising a collapsible support for engaging the support rail and supporting the guiderail, the collapsible support adapted for being extended and retracted in a direction transverse to the conveying direction and generally parallel to the plane of the conveyor to selectively position the guiderail relative to the support rail;

wherein the collapsible support comprises a pair of arms connected for relative pivoting movement at one end, and each connected to a shuttle for engaging the support rail at another end.

2. The apparatus of claim 1, wherein each arm of the pair of arms is pivotably connected to a connector, the connector including a receiver adapted for receiving a portion of the guiderail.

3. The apparatus of claim 2, wherein the connector includes an extension for engaging the support rail to prevent the pair of arms from reaching a locked position.

4. The apparatus of claim 1, wherein each shuttle comprises a retainer for engaging the support rail.

5. The apparatus of claim 1, wherein each shuttle includes at least one roller for rotatably engaging the support rail.

6. The apparatus of claim 1, further including an actuator for actuating movement of the shuttles along the support rail toward each other to extend the guiderail and away from each other to retract the guiderail.

7. The apparatus of claim 6, wherein the actuator comprises a cable, and each shuttle comprises a clamp for clamping the shuttle to either a forward run of the cable or a return run of the cable.

8. The apparatus of claim 6, wherein the support rail supports a pulley for guiding the cable.

9. The apparatus of claim 6, further including a motor for moving the cable to and fro along an endless path.

10. An apparatus for supporting a guiderail for guiding one or more articles conveyed along a conveyor having a conveying surface defining a conveying path in a conveying direction, the conveying surface further defining a plane of the conveyor, comprising:

a support rail; and at least one collapsible support for engaging the support rail and supporting the guiderail, wherein the collapsible support comprises first and second arms, each connected to each other at a first end for relative pivoting movement, and each of the first and second arms connected at a second end to a respective first and second shuttle, said first and second shuttle adapted for slidably engaging the support rail;

wherein the collapsible support is adapted for being extended from the support rail along a support path that is both transverse to the conveying direction and generally parallel to the plane of the conveyor, by movement of the first and second shuttle toward each other, and the collapsible support is further adapted for being retracted toward the support rail along the support path by movement of the first and second shuttle away from each other to selectively position the guiderail relative to the support rail.

11. The apparatus of claim 10, further including a connector connected to the first end of the first and second arms.

12. The apparatus of claim 11, wherein the connector is adapted to connect to the guiderail.

13. The apparatus of claim 11, wherein the connector includes an extension for engaging the support rail to prevent the first and second arms from reaching a locked position.

14. The apparatus of claim 10, wherein each shuttle includes at least one roller for rotatably engaging the support rail.

15. The apparatus of claim 10, further including an actuator for actuating movement of the shuttles along the support rail.

16. The apparatus of claim 15, wherein the actuator comprises a cable, and each shuttle comprises a clamp for clamping the shuttle to either a forward run of the cable or a return run of the cable.

* * * * *